US008528067B2

(12) United States Patent
Hurry et al.

(10) Patent No.: US 8,528,067 B2
(45) Date of Patent: Sep. 3, 2013

(54) ANYTIME VALIDATION FOR VERIFICATION TOKENS

(75) Inventors: Simon Hurry, Foster City, CA (US); Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 155 days.

(21) Appl. No.: 13/005,137

(22) Filed: Jan. 12, 2011

(65) Prior Publication Data

US 2011/0173684 A1 Jul. 14, 2011

Related U.S. Application Data

(60) Provisional application No. 61/294,338, filed on Jan. 12, 2010.

(51) Int. Cl.
*G06F 7/04* (2006.01)
*H04L 29/06* (2006.01)
*H04L 9/32* (2006.01)

(52) U.S. Cl.
USPC ................. 726/9; 726/20; 713/159; 713/172

(58) Field of Classification Search
USPC ............................ 726/9, 20; 713/159, 172
See application file for complete search history.

(56) References Cited

U.S. PATENT DOCUMENTS

| | | | |
|---|---|---|---|
| 6,886,102 B1* | 4/2005 | Lyle | 726/23 |
| 6,971,028 B1* | 11/2005 | Lyle et al. | 726/25 |
| 2003/0154376 A1 | 8/2003 | Hwangbo | |
| 2004/0268142 A1 | 12/2004 | Karjala et al. | |
| 2009/0031131 A1* | 1/2009 | Qiu et al. | 713/172 |
| 2010/0136943 A1* | 6/2010 | Hirvela et al. | 455/404.1 |

FOREIGN PATENT DOCUMENTS

KR 10-2007-016055 A 11/2007

OTHER PUBLICATIONS

International Search Report and Written Opinion dated Sep. 9, 2011, issued in related International Patent Appln. No. PCT/US2011/020973.

* cited by examiner

*Primary Examiner* — Teshome Hailu
(74) *Attorney, Agent, or Firm* — Kilpatrick Townsend Stockton

(57) ABSTRACT

Systems and method for producing, validating, and registering authentic verification tokens are disclosed. Such systems and methods include generating verification token specific key pairs. The key pairs can be signed by a verification token manufacturer master key or public key certificate for an additional level of authenticity. Related methods and systems for authenticating and registering authorized verification token manufacturers are also disclosed. Once a verification token manufacturer is authenticated, it can be assigned a manufacturer-specific key pair or certificate and in some cases, a predetermined set of serial numbers to assign to the verification tokens it produces. Each serial number can be used to generate a verification token specific key pair specific to the associated verification token. One component of the verification token key pair can be stored to the verification token. Optionally, the component of the verification token key pair stored to the verification token can be signed by the manufacturer specific master key or certificate and stored a verification token public certificate.

16 Claims, 11 Drawing Sheets

ANYTIME VALIDATION FOR VERIFICATION TOKENS

CROSS-REFERENCES TO RELATED APPLICATIONS

This application is based on and claims priority to and U.S. Provisional Patent Application No. 61/294,338, entitled "Anytime Reader Device Validation Service for Contactless Verification Tokens," filed Jan. 12, 2010, and is also related to U.S. Provisional Patent Application No. 61/178,636, entitled "Dynamic Data Authentication," filed May 15, 2009. Both provisional patent applications are incorporated herein by reference in their entirety for all purposes.

BACKGROUND

As methods and devices for engaging in financial transactions have increased, old problems such as fraud and counterfeiting persist.

One of the primary sources of fraud, which is prevalent in the credit card industry, is skimming. Skimming refers to the electronic copying of a card's electronically stored data to create counterfeit cards. Once the counterfeit card is made, there is potential that it can be used with impunity for as long as the user or the issuing entity does not realize or report that the transaction card's information has been compromised. This problem is particularly prevalent in card-not-present transactions, such as online purchases and transactions where a counterfeiter need not be identified by a photo-ID that matches the information imprinted or stored on the transaction card or other portable consumer device.

To combat such counterfeiting or other unauthorized use for online or other traditional card-not-present transactions, some issuing entities have started issuing contact and contactless card verification tokens, also referred to as verification tokens, to be used in conjunction with a user's computer. The card verification token can verify that the user performing the transaction is in physical possession of the transaction card. This stops potential fraud in which the fraudster has only obtained the information and not the transaction card itself. However, even the use of a verification tokens can allow various forms of fraud.

One such potential method of fraud is for counterfeiters or fraudsters to manufacture their own version of the card reader devices or verification tokens that are physically and operationally similar to the authorized versions so as not to raise the suspicions of end users. The fraudster can then distribute these fraudulent card reader devices or verification tokens to users that are configured to skim user data from the transaction cards whenever it is used in a transaction and have that data sent to a site or server operated by the counterfeiter. As such, there is a need to verify card reader devices or verification tokens are authorized devices manufactured by a trusted source and not a fraudulent skimming device made and distributed by a counterfeiter or fraudster.

Embodiments of the invention are directed to addressing these and other issues.

BRIEF SUMMARY

Embodiments of the present invention include methods for authenticating and registering a verification token manufacturer that includes receiving a registration request from a verification token manufacturer at a server computer and retrieving information related to the verification token manufacturer from a database and generating a manufacturer specific key pair using the server computer. Other embodiments can include performing a risk review based on the information related to the verification token manufacturer.

Other embodiments of the present invention, include both asymmetric and symmetric methods for validating authenticating and registering a verification token manufacturer which includes generating a manufacturer specific key pair for the verification token manufacturer (asymmetric) or generating a master key (symmetric). The manufacturer specific key pair can comprise a public and a private component. Embodiments can also include signing the public component of the manufacturer specific key pair with using the payment scheme certificate authority (CA) and sending the verification token manufacturer key pair with the signed public component to the verification token manufacturer. Such methods can also include associating the manufacturer specific key pair, the CA root public key and the signed public component of the manufacturer specific key pair with a verification token manufacturer identifier and storing the associated reader-device manufacturer identifier in a database.

Various other embodiments of the present invention include methods for validating a verification token before it can be used to initiate a transaction. Such methods can include receiving a validation request from a verification token and determining a verification token serial number based on the validation request. Such embodiments can include determining a registration status of the verification token serial number, determining a verification token manufacturer identifier based on the validation request, and determining a first component of a manufacturer specific key pair based on the verification token manufacturer identifier. Such embodiments can also include retrieving a second component of the manufacturer specific key and a verification token manufacturer master key from a database based on the verification token manufacturer identifier and performing a mutual authentication with the verification token. Embodiments can also include performing a mutual authentication comprising determining a verification token key based on the verification token serial number and the verification token manufacturer master key and establishing a verification token key session based on the verification token key. Establishing a verification token key session can also include generating a third component of the manufacturer specific key based on the verification token serial number and a master key associated with the server computer.

Other embodiments of the present invention include methods for producing an authentic verification token. Such methods include generating a serial number for a verification token, generating a key pair including a public component and a private component, signing the public component of the key pair with a manufacturer specific private key, storing the signed public component of the key pair to a memory in the verification token together with the Certificate Authority (CA) root key and associating the serial number with the key pair, the signed public component. Such embodiments can further comprise storing the serial number, a manufacturer identifier, code executable on a processor to the memory of the verification token. The code can include instructions for a processor to establish a connection with a verification server over a communication session using a communication facility of a computer to which the verification token is connected.

DETAILED DESCRIPTION

Figure 1:
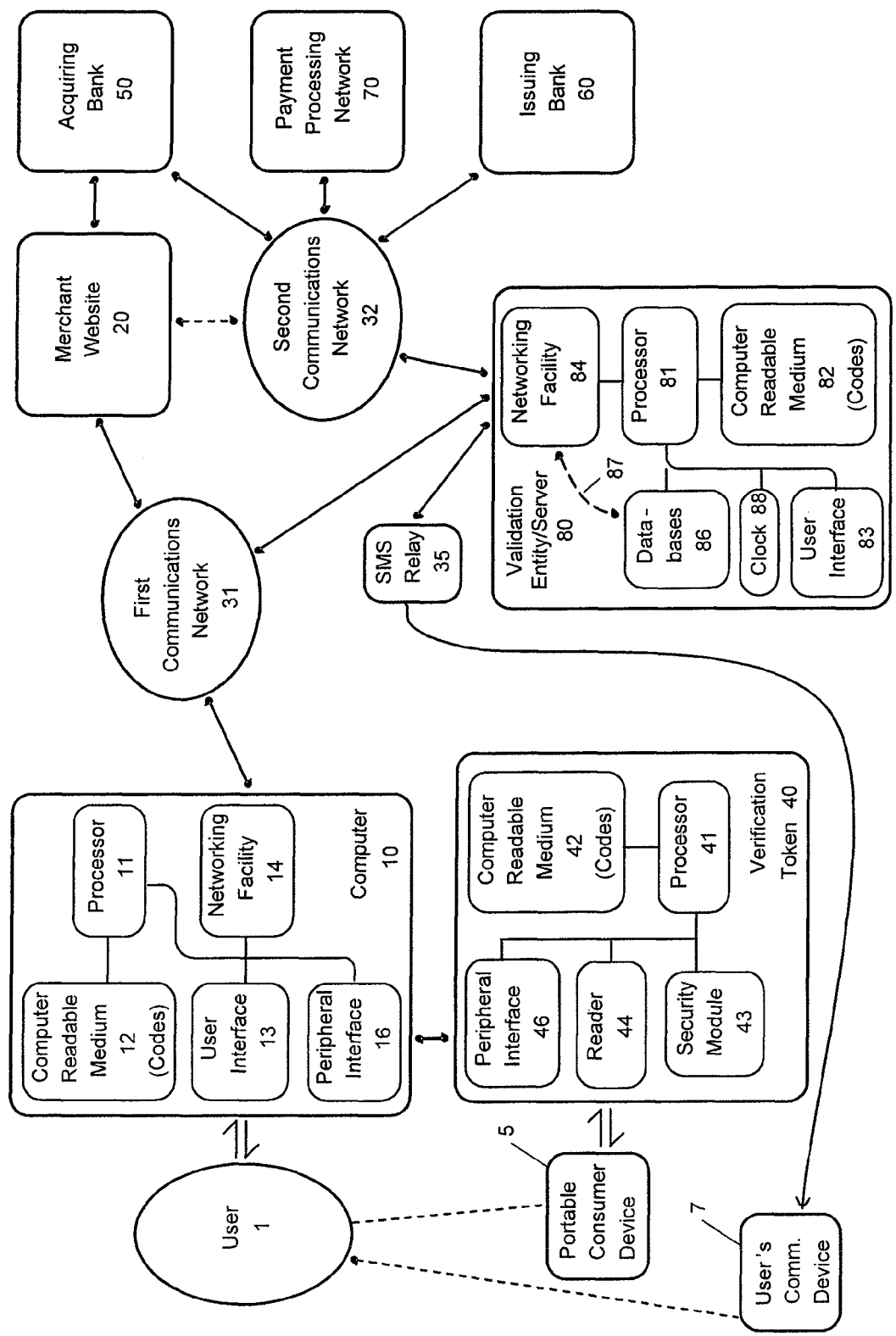
FIG. 1 is a schematic of a system that can benefit from various embodiments of the present invention in the context of a payment card transaction conducted online.

Embodiments of the present invention are directed toward devices, systems and methods for authenticating transaction card reader devices or verification tokens for use in a transaction system. As used herein, the terms user token reader devices, token reader devices and verification tokens, can be used interchangeably to refer to any device that can be used to read information from and verify the presence or authenticity of portable consumer devices, user tokens, or transaction cards. A verification token can include any combination of hardware, firmware and software suitable for reading, processing or sending data to and from a portable consumer device. Verification tokens can include embedded devices, such as internal components, integrated circuits, and computer boards in a computer or communication device or peripheral devices, such as USB devices or dongles which connect to or communicate with a computing or communication device over a peripheral interface. A communication device can include any device suitable for sending, receiving and processing data including, but not limited to mobile phones, smart phones, PDAs, etc.

Portable consumer devices, user tokens or transaction cards comprise devices that hold or store identification information pertaining to an account held by a user with another entity, which is typically an entity that holds, extends, or credits items of value to the user (e.g., monetary funds, credits, debts, etc.). The terms portable consumer device, user token or transaction card can be used interchangeably to refer to various forms of credit cards, charge cards, debit cards, bank cards, prepaid cards, access cards, security cards, and other cards that identify an account held by a user with another entity. The portable consumer devices are capable of existing in both passive forms (e.g., card with a magnetic stripe or RFID components) and active forms (e.g., integrated circuit cards, smartcards), and further include portable electronic devices that, in whole or in part, function as such cards. Such portable electronic devices can include memory cards, account tokens, fobs, RFID devices, stickers, cellular telephones (including near-field communications phone), keychain devices (such as the Speedpass™ commercially available from Exxon-Mobil Corp. or payWave™ commercially available from Visa, Inc.), personal digital assistants, other mobile electronic devices, transponders, smart media, and pagers.

The identification information held by (e.g., embodied on) a portable consumer device comprises at least an account number or other identifier, such as an account name or a portable consumer device serial number. The account number may comprise alphanumeric characters. The identification information may further comprise the name of the account holder (e.g., the user), the expiration date of the card, service codes, and discretionary data. As an example, the identification information may include the conventional "payment data" stored on the tracks of the magnetic stripe of a conventional credit card (e.g., Track 1, Track 2, and/or Track 3).

The identification information of a portable consumer device is read by a reader, which is an electrical component of a verification token that can read the identification information from a portable consumer device and provide the identification information to another electrical component. A reader may comprise one or more of the following: a magnetic stripe reader, a card contact reader, and a contactless reader, the latter of which is commonly known as an RFID reader (RFID being an acronym for radio-frequency identification). Readers are predominantly found at point-of-sales locations of merchants. However, increasingly, readers are included as part of a verification token given to users for use on a personal computer to use in online transactions or other activities in which an issuing, acquiring, merchant or other entity cannot personally verify the identify of the authorized user or the authenticity of the portable consumer device. This trend presents an opportunity to fraudsters and a corresponding risk of potential fraud to users, issuers, and acquirers.

FIG. 1 illustrates an exemplary system which can benefit from various aspects of the invention and is described in detail to give context to various embodiments, but should not be considered limiting in anyway. The system in FIG. 1 is illustrated and described in the context of an online purchase.

Transaction systems, like the one shown in FIG. 1, that use portable consumer device can be susceptible to fraudulent manufacturers making and introducing unauthorized verification tokens into the stream of commerce to skim user information, such as credit card numbers, from unsuspecting users. To avoid the possibility of an unauthorized manufacturer from skimming user information during a transaction performed with an unauthorized verification token, it is desirable to pre-authenticate or pre-register a verification token before its use is permitted to complete any transactions. Thus, embodiments provide a more secure, and therefore for a more likely, for users to make online transactions using portable consumer devices.

Shown in FIG. 1 are icons for a user 1, a portable consumer device 5, a communication device 7 (such as a cell phone), a computer 10, a merchant's website 20, and a first communications network 31 that enables the user's computer and the merchant's website to communicate with one another. The first communications network 31 may include the Internet, a telecommunications network (e.g., a wireless network, cell phone network, a telephone network, a cable network, or any combination thereof), a wide area network (WAN), a local area network (LAN), a home router or gateway coupled to one of the above networks, or any combination of the above. Also shown in FIG. 1 is an acquiring bank 50 for the merchant, an issuing bank 60 for the portable consumer device 5, a payment processing network 70, and a second communications network 32 that enables the payment processing network 70 to communicate with each of the banks 50 and 60.

The second communications network 32 may comprise the Internet (and therefore may overlap and share facilities with the first communications network 31), or may comprise one or more private networks, or combination of one or more private networks with the Internet. A private network may comprise a telecommunications network, a wide area network (WAN), a local area network (LAN), or any combination thereof. In some instances, the first and second communications networks 31 and 32 may be the same (such as a network using the Internet as the backbone). A communications network generally comprises a network of one or more communications links and two or more nodes that pass messages from one part of the network to another part. Each node comprises one or more pieces of electrical machinery, and each link may comprise one or more of the following: optical fibers, optical links, radio links, and electrical wires. The components described so far are, for the most part, conventional and arranged in a conventional manner.

Various embodiments of the present invention can be used to authenticate, register or optionally update an embedded or peripheral verification token 40 prior to being used for the first time in a transaction system such the one shown in FIG. 1. In some embodiments, preregistration or pre-authentication of verification tokens can be completed without entering, sending, or otherwise using a user's portable consumer device, such as an RFID card, or releasing any other user information. In some embodiments, a verification token can be authenticated by having the verification token communicate with a host server over any suitable communication medium and implementing a symmetric or an asymmetric mutual authentication scheme. In such embodiments, however, it is necessary to ensure that the verification token technology or authentication scheme cannot be manufactured, reproduced, or distributed by an unauthorized manufacturer so that fraudulent verification tokens cannot be introduced into the market to skim user data and transmit it to fraudsters. Since it is difficult to keep such technology and schemes from being hacked or copied, it is advantageous to take additional precautions. Various other aspects of FIG. 1 will be described in more detail below in reference to embodiments of the present invention.

Figure 2:
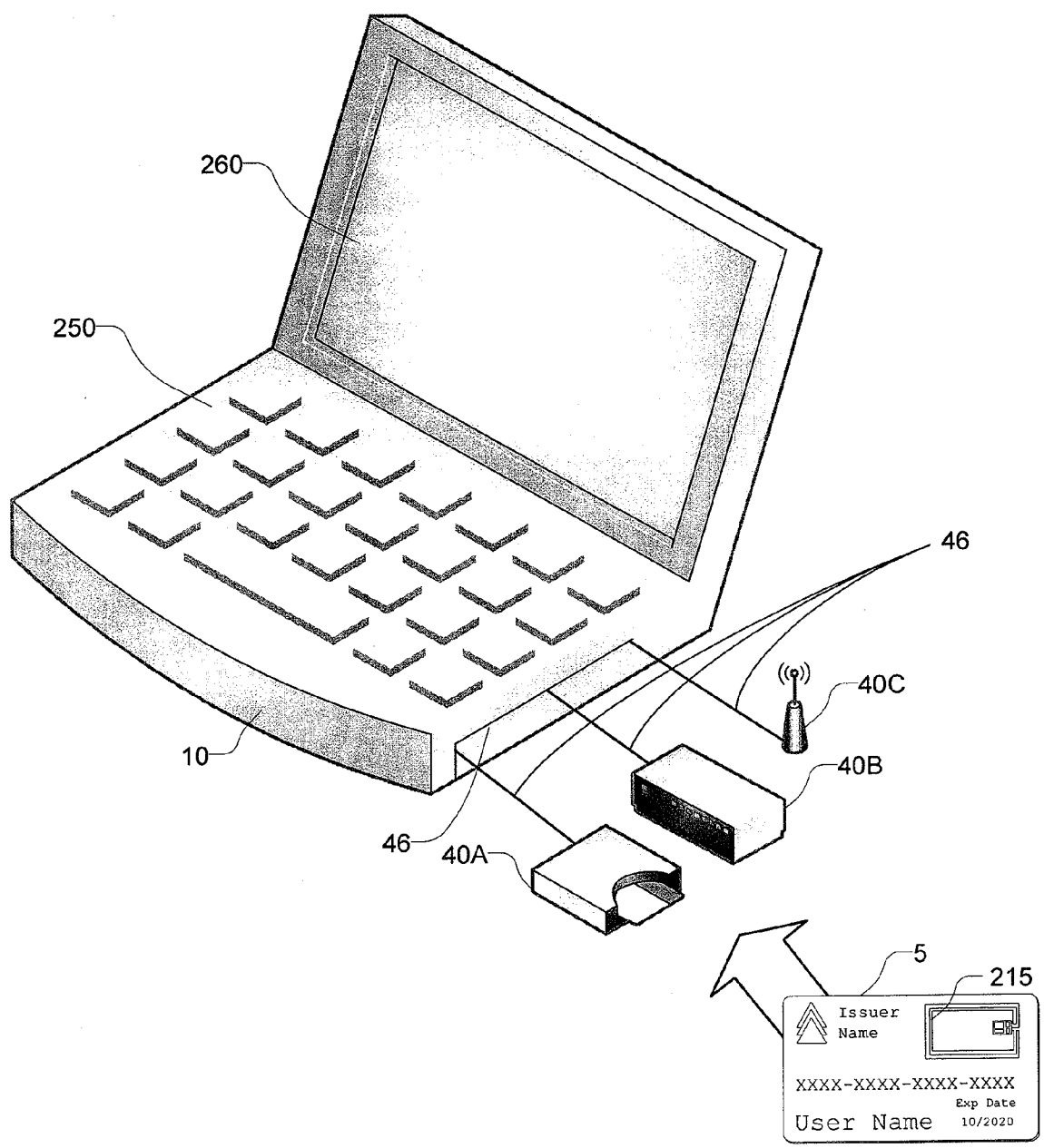
FIG. 2 shows an exemplary configuration that can implement various embodiments of the present invention.

FIG. 2 depicts a configuration of a computer 10, various verification tokens 40A, 40B, and 40C, and a portable consumer device 5 that can be used in implementations of various embodiments of the present invention. Computer 10 can include user interface devices, such as keyboard 250 and display 260. Verification tokens 40A, 40B, and 40C can have a USB interface or other peripheral interface that can connect to a peripheral interface 16 on computer 10. The peripheral interface 16 on computer 10 can be implemented as various standard or proprietary peripheral interface protocols suitable for connecting a verification token to the computer 10. By pre-authenticating or pre-registering verification token manufacturers and requiring specific practices and protocols for those manufacturers in the manufacture of authentic verification tokens, various embodiments of the present invention provide additional levels of security against potential fraudsters from skimming sensitive personal or user account information using a fraudulent, counterfeit or otherwise unauthorized verification token.

Verification tokens 40A, 40B, and 40C can have USB interfaces or other peripheral interface 46 that can connect to a peripheral interface 16 on computer 10. As shown in FIG. 2, computer 10 can include a display 260 and input device 250 like the keyboard shown.

The peripheral interface 16 on computer 10 can be implemented as various standard or proprietary peripheral interface protocols suitable for connecting a verification token to computer 10. Such standards can include USB, USB 2.0, Firewire™ (IEEE 1394), parallel and serial ports, etc. For example, verification token 40A can be a USB-based contact magnetic strip reader, verification token 40B can be a USB or FireWire™ based RFID reader, while verification token 40C can be some other type of wireless portable consumer device reader that is embedded within the hardware computer 10 or internally connected to the motherboard or internal bus.

The user can then present portable consumer device 5 to one or more of the compatible verification tokens to initiate, process, or otherwise complete a transaction using computer 10. However, prior to using the verification token in an actual transaction or authentication request, the authentication or validation entity/server can require that the verification token authenticate itself using various systems and methods according to embodiments of the present invention. The basis of the systems and methods for authenticating a verification token can include processes, methods, and systems for the preregistration or pre-authentication of a verification token manufacturer and the actual manufacture and programming of the verification tokens, which will be described in more detail below.

As shown in FIG. 1, computer 10 may comprise a desktop computer, a laptop computer, or any portable electronic device that has a networking facility and a peripheral interface for communicating with one or more peripheral devices. Computer 10 has one or more processors 11, a tangible computer-readable medium 12 coupled to processor(s) 11 that stores instruction codes (software) that direct processor(s) 11 and that stores data used by processor(s) 11, and a user interface 13 coupled to processor(s) 11. Networking facility 14 and peripheral interface 16 can also coupled to processor(s) 11, with networking facility 14 also being coupled to first communications network 31. User interface 13 comprises one or more video output devices (e.g., displays, screens) and one or more input devices (e.g., keyboard, mouse, trackball, etc.) for user 1 to receive information from computer 10 and to provide input to computer 10.

Computer-readable medium 12 may comprise a combination of semiconductor memory and non-volatile storage, such as one or more disk drives and/or non-volatile memory. Computer-readable medium 12 stores an operating system for computer 10, which enables processes and applications to be run by processor(s) 11. The operating system provides services to these processes and applications, and enables these processes and applications to access components of user interface 13, portions of computer-readable medium 12, networking facility 14, peripheral interface 16, and other components of computer 10. The operating system may be complex and full featured, such as found on desk-top computers, or simplified, such as found on cell phones, PDAs, and many other types of portable electronic devices.

Networking facility 14 of computer 10 may comprise software and hardware that enable a process running on computer 10 to communicate with a communications network, such as network 31, to send and receive messages, data, and the like to one or more entities coupled to the communications network. The hardware of facility 14 may comprise dedicated hardware separate from processor(s) 11, or the shared use of processor(s) 11, or a combination thereof. The software of facility 14 may comprise firmware, software stored in computer-readable medium 12 or another computer-readable medium, portions of the operating system, or a combination of any of the preceding items.

Networking facility 14 is preferably a non-exclusive resource, allowing access to the communications network by other processes and applications being run by computer 10. Peripheral interface 16 of computer 10 comprises a wired or wireless connection that enables a peripheral device (separate from computer 10) to communicate with the computer. Conventional wired connections include universal serial bus (USB) connectors ("USB ports"), serial ports, parallel ports, and PCMCIA ports. Conventional wireless connections include infra-red (IR) base stations and Bluetooth™ base stations that are built into computer 10 or that are coupled to a peripheral interface of computer 10.

In addition to reader 44 and peripheral interface 46, verification token 40 further comprises a processor 41, a tangible computer-readable medium 42 coupled to processor 41 holding data and codes that direct the operation of processor 41, a security module 43 coupled to processor 41 and adapted to securely store one or more encryption keys and to encrypt and decrypt data for verification token 40, a reader 44 coupled to processor 41 and adapted to read portable consumer devices 5, and a peripheral interface 46 coupled to processor 41 and adapted to communicate to computer 10 by way of peripheral interface 16.

Processor 41 may comprise a conventional microprocessor, and computer-readable medium 42 may comprise a combination of semiconductor memory and non-volatile storage, such non-volatile memory. Computer-readable medium 42 can include the storage of several datum elements, processor codes that direct the operation of processor 41, and processor memory which processor 41 may use in carrying out its tasks. Referring back to FIG. 1, security module 43 may comprise encryption and decryption circuitry (which may include one or more processors), and may comprise one or more encryption keys stored in a secured memory. Security module 43 may also include firewall security circuitry that protects verification token 40 from attacks from hackers conducted through peripheral interface 16.

Reader 44 may comprise a convention reader. Peripheral interface 46 may comprise a wired or wireless connection adapted to communicate with peripheral interface 16 of computer 10. Conventional wired connections include universal serial bus connectors ("USB ports"), serial ports, parallel ports, and PCMCIA ports. Conventional wireless connections may include infra-red and Bluetooth™ remote stations. When using a conventional wired connection with peripheral interface 46, verification token 40 may be detachably coupled to computer 10 at peripheral interface 16, such as at a USB port connector.

Verification token 40 can also include various codes embodied on computer-readable medium 42 that direct data processor 41 to perform respective actions. A first code can direct data processor 41 to communicate with computer 10 by way of peripheral interface 46 so as to gain access networking facility 14 of computer 10. The first code may comprise code that directs data processor 41 to send a device driver to computer 10 and an instruction to install the device driver in the computer's operating system, wherein the device driver is a collection of instructions to be run by computer 10 that enables computer 10 to recognize the verification token and communicate with the verification token 40, and enables the token's data processor 41 to make function calls to various (API) of the computer's operating system, such as those related to networking and accessing networking facility 14.

So called "self-installing" drivers are known to the art, and can be used here. They comprise one or more function calls to an application programming interface (API) of the computer's operating system, such as the device manager's API. The first code may be configured to work with a selected operating system, such as Windows or Symbian OS, or may be configured to work with several operating systems. In the latter case, the first code may include several device drivers for the various operating systems, and instructions that query computer 10 for its operating system type and select (and install) the driver most appropriate for the computer's operating system. The device drivers may be stored in a section of computer-readable medium 42.

A second code of verification token 40 directs processor 41 to receive identification information read from portable consumer device 5 by the reader 44. The second code may include code that directs the processor 41 to receive a universal resource identifier (URID) of a validation entity/server 80, as read from portable consumer device 5 by the reader 44. These instructions may include conventional I/O instructions that direct the communications with reader 44. Different portable consumer device 5 may store and provide different URID's to different validation entities 80. A uniform resource identifier (URID) may comprise a uniform resource locator (URL), an Internet-protocol address (IP-address), or any other type of identifier that can identify an entity on a communications network.

If a portable consumer device 5 does not provide a URID to validation entity/server 80, verification token 40 may store a URID to a default or a manufacturer specific validation entity/server 80. In some configurations, some verification tokens 40 may be co-branded with respective issuing banks and only work for portable consumer devices that are co-branded with the same issuing banks, and each issuing bank may have its own validation entity/server 80 with its own URID. In such a configuration, these verification tokens 40 may store the URIDs to their respective co-branded validation entities 80. Instead of, or in addition to, this configuration, some verification tokens 40 may be associated with respective payment processing networks 70, and each such network may have its own validation entity/server 80. In such a configuration, these verification tokens 40 may store the URIDs to their respective associated validation entities 80.

Accordingly, the second code of verification token 40 may be further configured to direct data processor 41 to only use a default URID stored by verification token 40, or to use a default URID if portable consumer device 5 does not provide verification token 40 with a URID to validation entity/server 80. As yet another implementation, verification token 40 may include code that directs processor 41 to select one of a number of URIDs stored in verification token 40 based on a bank number provided in the identification information or embedded in the account number. The above further direction and codes may be implemented with conventional I/O instructions, memory access instructions, and CPU logical and control instructions. One or more URIDs to validation entities may be stored in computer readable memory 42.

A third code of verification token 40 directs data processor 41 to establish communications with validation entity/server 80 using networking facility 14 of computer 10. The operating system of computer 10 comprises one or more software modules and application programs, generically called "network services modules" herein, that can access networking facility 14 and set up communication sessions to entities on communications network 31. Such network services modules include Microsoft's Windows Communications Foundation (e.g., .NET 3.0, .NET 4.0, etc.), Apple's CFNetwork Framework, the networking section of the Unix and Linux operating system kernels, the OS Services Layer and the Base Services Layer of the Symbian operating system, Internet browsers, and the like.

Each of these network services modules is non-exclusive (e.g., capable of serving more than one processor and more than one process/application) and provides an application programming interface (API) to a collection of functions that a processor can access using respective function calls. With these API facilities, a collection of function calls can be readily constructed for a processor to execute that enables the processor to establish a communications channel with an entity on a communications network coupled to networking facility 14, and to exchange messages and data with the entity.

The third code of verification token 40 comprises such a collection of function calls to the API of a network services module of computer 10, including one or more function calls that provide the universal resource identifier (URID) for validation entity/server 80 and an instruction to establish a session with the validation entity. The session may be a secure socket layer (or secure transport layer) session (e.g., SSL session) with mutual authentication. As part of establishing the session in some implementations, the third code of verification token 40 may include directing data processor 41 to provide, or to cause to be provided, a network address for the token to the computer's network services module and to validation entity/server 80. The network address may be static or dynamic, the latter of which may be obtained through API function calls to the computer's network services module. The network address may an IP address.

If verification token 40 is configured to use an Internet browser for a network services module, it may further comprise API function calls to the computer's operating system to initiate an instance of the browser and provide it with access to the browser instance. In some implementations, such as when verification entity 40 stores the URID of validation entity/server 80, the third code may direct the data processor 41 to establish communications with validation entity/server 80 well before user 1 presents portable consumer device 5 to reader 44. Verification 40 and validation 80 may keep the communication session active until device 5 is presented to reader 44, and between times that device 5 is presented to reader 44, by intermittently exchanging "heartbeat" messages. For example, verification token 40 may periodically, aperiodically, or randomly send messages to validation entity/server 80 confirming its presence in the session, and validation entity/server 80 may send a reply message confirming its presence in the session.

A fourth code of verification token 40 directs the data processor 41 to transmit at least a portion of identification information to validation entity/server 80 by way of networking facility 14 of computer 10, wherein the identification information is transmitted in encrypted form. If an SSL session has been established, the fourth code may direct data processor 41 to pass the identification information to the computer's network services module using appropriate function calls to the API for the network services module, and the identification information may be transmitted in the SSL session, where the transmitted and received data are encrypted by a session key. For an additional layer of security, the fourth code may further comprise code that directs processor 41 to encrypt the identification information with the help of security module 43 using an encryption key stored in token 40 before providing it to networking facility 14. These instructions may include conventional I/O instructions that direct the communications with security module 43 to pass the identification information to module 43 and to receive back the encrypted information. An encryption key for this may be stored in computer-readable medium 42 or in security module 43.

The use of function calls to various application programming interfaces (APIs) of the operating system of computer 10 its support modules, facilities, and its applications is well known to the software art, and one of ordinary skill in the art will be able to construct instructions and API function calls to implement the above-described codes and tasks in view of this disclosure without undue experimentation.

Figure 3:
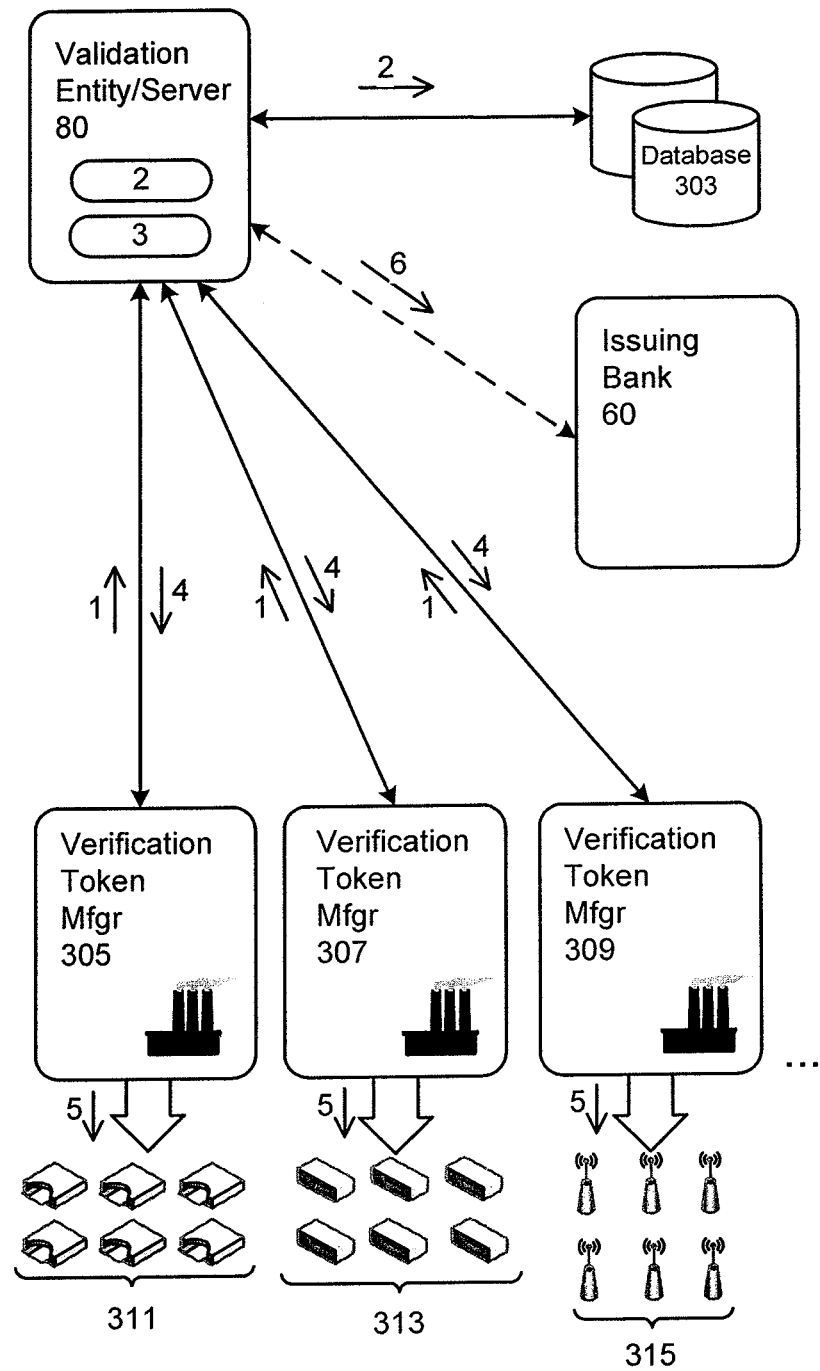
FIG. 3 is a schematic of a system for producing verification tokens according to various embodiments of the present invention.

FIG. 3 is a schematic of a system 300 for registering and authenticating verification token manufacturers according to one embodiment of the present invention. System 300 can include a validation entity/server 80 connected to a communication network, such as first communication network 31. Via communication network 31, validation entity/server 80 can also be coupled to a database 303, issuing bank 60, and a number of verification token manufacturers 305, 307, and 309. Validation entity/server 80 can be operated by an issuer, an acquirer, a merchant, or a payment processing network 70, such as Visa Net™.

Validation entity/server 80 can be configured and/or programmed to require that a verification token manufacturer that wishes to manufacture authentic or otherwise approved verification tokens to submit a registration or validation request. In some embodiments, validation entity/server 80 can host a website or other user interface so verification token manufacturers 305, 307, or 309 can download the appropriate forms and/or specifications regarding the information that the validation entity/server 80 requires to ultimately validate or register a verification token manufacturer.

Verification token manufacturers can gather all the requisite information and then submit a registration or validation request to validation entity/server 80 in action 1. The forms, instructions, or specifications provided by validation entity/server 80 can require that the registration requests include verification token manufacturer specific information such as manufacturer name, location, business references, or any other information that the validation entity/server 80 can use to access information regarding the requesting verification token manufacturer or to evaluate the legitimacy of the requesting verification token manufacturer. The validation entity/server 80 can use the information submitted in the registration request to gather and evaluate information regarding the requesting verification token manufacturer to determine whether the requesting verification token manufacturer is a trustworthy or legitimate entity.

In some embodiments, the determination as to the trustworthiness or legitimacy of a requesting verification token manufacturer can be based on internal risk analysis protocols of the entity that operates the validation entity/server 80 in action 2. For example a payment processing network, such as a credit card payment processing network, can apply its own internally developed risk and fraud management protocols to evaluate each requesting verification token manufacturer. In some embodiments, when the validation entity/server 80 receives a registration request from a verification token manufacturer, it can parse the information from the registration request to construct queries and/or requests of its own for the purpose of gathering background information regarding the requesting verification token manufacturer. In some embodiments, validation entity/server 80 can query various databases such as database 303 for background information regarding the requesting verification token manufacturer.

In embodiments in which the validation entity/server 80 is operated by an entity that does not have its own risk or fraud management protocols, the validation entity/server 80 can send the registration requests for information from the registration request to an external analysis service or entity to determine whether to register or validate the requesting verification token manufacturer in action 2. For example, validation entity/server 80 can send registration request information, or a request or inquiry containing registration request information, to database 303 to determine if the requesting verification token manufacturer is listed with a particular status or designation.

Specifically, database 303 can be a law enforcement or industry run database that lists known fraudsters or counterfeiters based on criminal conduct, consumer complaints or civil litigation reports. Alternatively, database 303 can also list entities based on their trustworthiness, credit score, industry ranking or rating or other telltale indications that the requesting verification token manufacturer is likely to be a trustworthy or legitimate manufacturer. In yet other embodiments, database 303 can be constructed, operated, and maintained by the same entity that operates the validation entity/server 80.

Based on the results of the internal or external fraud or risk management protocols, validation entity/server 80 can determine whether the requesting verification token manufacturer will be deemed trustworthy and, consequently, registered as a trusted verification token manufacturer in action 3. Once the determination is made as to whether the requesting verification token manufacturer will be registered as a trusted or legitimate manufacturer, validation entity/server 80 can send a response message or registration message to the requesting verification token manufacturer in action 4. In the case that the validation entity/server 80 determines that the requesting verification token manufacturer does not represent a suitable risk according to the risk tolerances of the validation entity/server 80, the operating bank, payment processing network, issuer etc., validation entity/server 80 can send a response message that includes an indication that the registration request has been denied.

In such embodiments, the response message that includes an indication of denial can also include an explanation or other indication as to why the registration request was denied. In addition, validation entity/server 80 can register an identifier associated with the denied verification token manufacturer as a previously or currently denied verification token manufacturer. In such embodiments, a list of denied verification token manufacturers can be stored in a table or in database 303. Such lists of denied verification token manufacturers can also include the reason or deficiencies for which the verification token manufacturer was denied. If a denied verification token manufacturer submits a new validation request, the validation entity/server 80 can reference the list of the denied verification token manufacturers in addition to or in substitute of applying fraud or risk management protocols.

In the event that the response or registration message includes an approval or validation of the requesting verification token manufacturer, the response or registration message can also include additional information regarding the manufacture, standards and programming of registered or validated verification tokens. For example, the registration message can include a verification token manufacturer identifier, a verification token specific key, the key can include a symmetric key pair, an asymmetric key pair, seed key or code that must be used in manufacturing and configuration of the verification tokens. In some embodiments, components of the asymmetric key pair, asymmetric key pair, seed key or code can be signed by a master authentication certificate held by the validation entity/server 80, an issuing bank 60 or other entity that operates the validation entity/server 80. For example, verification token manufacturer 305 can receive a registration response message which indicates a manufacturer specific identifier, an asymmetric key pair of which the public component has been signed by the master certificates held by validation entity/server 80. The registration response message can also include a set, range, or algorithm for approved serial numbers that the verification token manufacturer can assign to the verification tokens it manufactures.

In yet other embodiments, the registration or response message can include instructions, directions, URLs or other addresses with which the requesting verification token manufacturer can access or obtain requirements and specifications for manufacturing authorized verification tokens. The requirements, specifications, or instructions can be general and applicable to all authorized verification token manufacturers, or can be specific to one particular authorized verification token manufacturer. In other embodiments, requirements, specifications, and instructions sent or otherwise provided to an authorized verification token manufacturer can be a combination of general and specific requirements, specifications, and instructions.

Once an authorized verification token manufacturer receives an approved registration response message and accesses the requirements, specifications and instructions for producing verification tokens, it can begin manufacturing verification tokens. For example verification token manufacturer 305 can produce contact-based magnetic stripe reader verification tokens 311 in action 5. Likewise, verification token manufacturers 307 and 309 can produce contactless RFID verification tokens as well as other wireless verification tokens 313 and 315 according to the specific requirements, specifications, and instructions provided to each individual verification token manufacturer.

For example, each verification token manufacturer can be required to imprint, etch, store, or otherwise include a manufacturer specific identifier in each verification token it produces. Additionally, each verification token can include a serial number from which other information, such as encryption information, can be derived, or determined. In some embodiments, the serial number of a particular verification token can be associated with a specific cryptographic algorithm or key pair. The verification token manufacturers can share such information with the validation entity/server 80. In such embodiments, the verification token, as produced by the verification token manufacturer, and the validation entity/server 80 can share various secret information for producing, determining, challenging and responding to one another using cryptographic information.

When the verification tokens are manufactured, the verification tokens can be distributed to users to be used with their compatible portable consumer devices, such as credit cards, debit cards, key fobs, etc.

Once distributed to a user, verification token may be required to be authenticated by the validation entity/server 80 before it can be used in conjunction with a portable consumer device or in any type of non-validation transaction. Code can be included in the computer readable medium 42 for prompting the user or instructing the processor 11 to use and authenticate the verification token. Instructions, which can be paper-based or electronic, may direct the user to couple the verification token to the user's computing device, such as a laptop or desktop computer. Once the verification token is coupled to the user's personal computing device, executable code that can be included on a computer readable medium 42 in the verification token 40 can be executed by the processor 11 of computer 10. In other embodiments, the executable code can be included on a separate computer readable medium, such as an electromagnetic, optical, or flash based drive, delivered along with the verification token. In yet other embodiments, the executable code can be downloaded from the validation entity/server 80 or another server associated with the validation entity/server 80. In some embodiments, the download site can be provided by a website hosted on the validation entity/server 80 or another server associated with the validation entity/server 80.

In some embodiments, executable code can include instructions for the networking facility 14 of the computer 10 to connect with the validation entity/server 80 over one or more communications network, such as the Internet. In such embodiments, executable code can be executed locally on the user's computing device or on a remote server, such as the validation entity/server 80 to complete one or more initial or subsequent validation programs or protocols. The executable code can include a fully automated validation protocol or a protocol that requires various user inputs or interaction.

For example, the executable code can include instructions to provide a user interface that prompts the user to enter user or verification token specific information for submission to the validation entity/server 80. In other embodiments, the verification token can complete an automated validation in the background without the need for user interaction, interference, or input. In any of such embodiments, the users computing device can send and receive validation or information according to the requirements of the validation entity/server 80 for validating the verification token.

Figure 4:
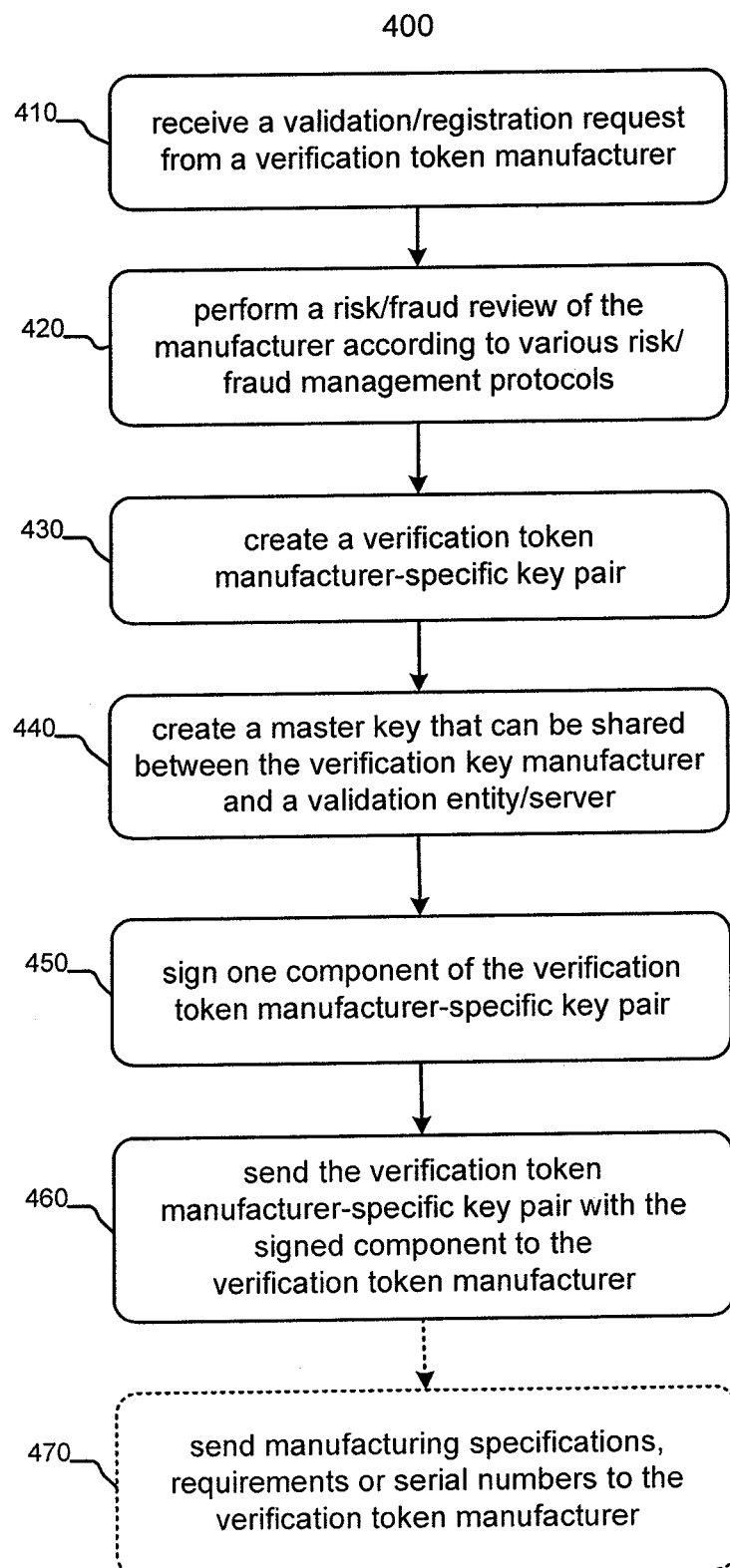
FIG. 4 is a flowchart of a method of validating and registering a verification token manufacturer according to an embodiment of the present invention.

FIG. 4 is a flowchart of a method according to one embodiment of the present invention for registering a verification token manufacturer to reduce or eliminate the possibility of an unauthorized verification token manufacturer from skimming user account information from a portable consumer device without the user's knowledge. All manufacturers of authorized verification tokens, regardless of whether the verification token is embedded into a computing or communication device or added as peripheral device such a USB device, can be required to register themselves as manufacturers with a validation entity/server 80 that operates within or in cooperation with one or more transaction systems. This setup phase and registration process can include the actions discussed above in reference to FIG. 3.

In action 410 of the method 400 shown in FIG. 4, the validation entity/server 80 can receive a request from a verification token manufacturer to register with the validation entity/server 80 or transaction system operator, such as a payment processing network 70. Next, in action 420, the validation entity/server 80 or the transaction system operator can perform a risk review of the manufacturers according to various internal and external risk protocols. Such reviews can include reference to both internal databases and outside databases or data sources such as credit reporting bureaus, fraud reporting bureaus, and law enforcement agencies. If the risk review is satisfactory to the host server or transaction system operator, then a manufacturer-specific key pair can be assigned to each manufacturer in action 430. In some embodiments the verification token manufacturer can generate the manufacturer-specific key, while in other embodiments, the validation entity/server 80 or transaction system operator can generate the manufacturer-specific key. The manufacturer-specific key can be either a symmetric key pair or an asymmetric key pair.

The validation entity/server 80 or the transaction system operator can create verification token manufacturer master key (KMC) that can be shared between manufacturer and the verification entity/server during registration in action 440. The keys and key pairs described herein can include symmetric, asymmetric, or other cryptographic type keys.

In action 450, the validation entity/server 80 can sign one component of the verification token manufacturer key pair to provide an additional level of verification when communicating with the verification token. The verification-token manufacturer can send one part of the manufacturer specific key pair, i.e. the public half of the key pair to the validation entity/server 80 to obtain a manufacturer-specific key or public key certificate to bind the key or public key to the verification token manufacturer. The key or public key certificate can include various manufacturer-specific information. For example, the key or public key certificate can include the manufacturers name or identifier, address, phone number, or any other information that can be used to verify that the key or public key belong to the manufacturer.

In such embodiments, the verification entity/server 80 or the verification token manufacturer 305, 307, or 309 or the verification token share a secret. The validation entity/server 80 can then send the verification token manufacturer specific key, with or without the signed component, to the approved/registered verification token manufacturer. Optionally, the validation entity/server 80 can send manufacturing specifications, requirements, or serial numbers to the registered verification token manufacturers according to which the registered verification token manufacturers can produce verification tokens.

Figure 5:
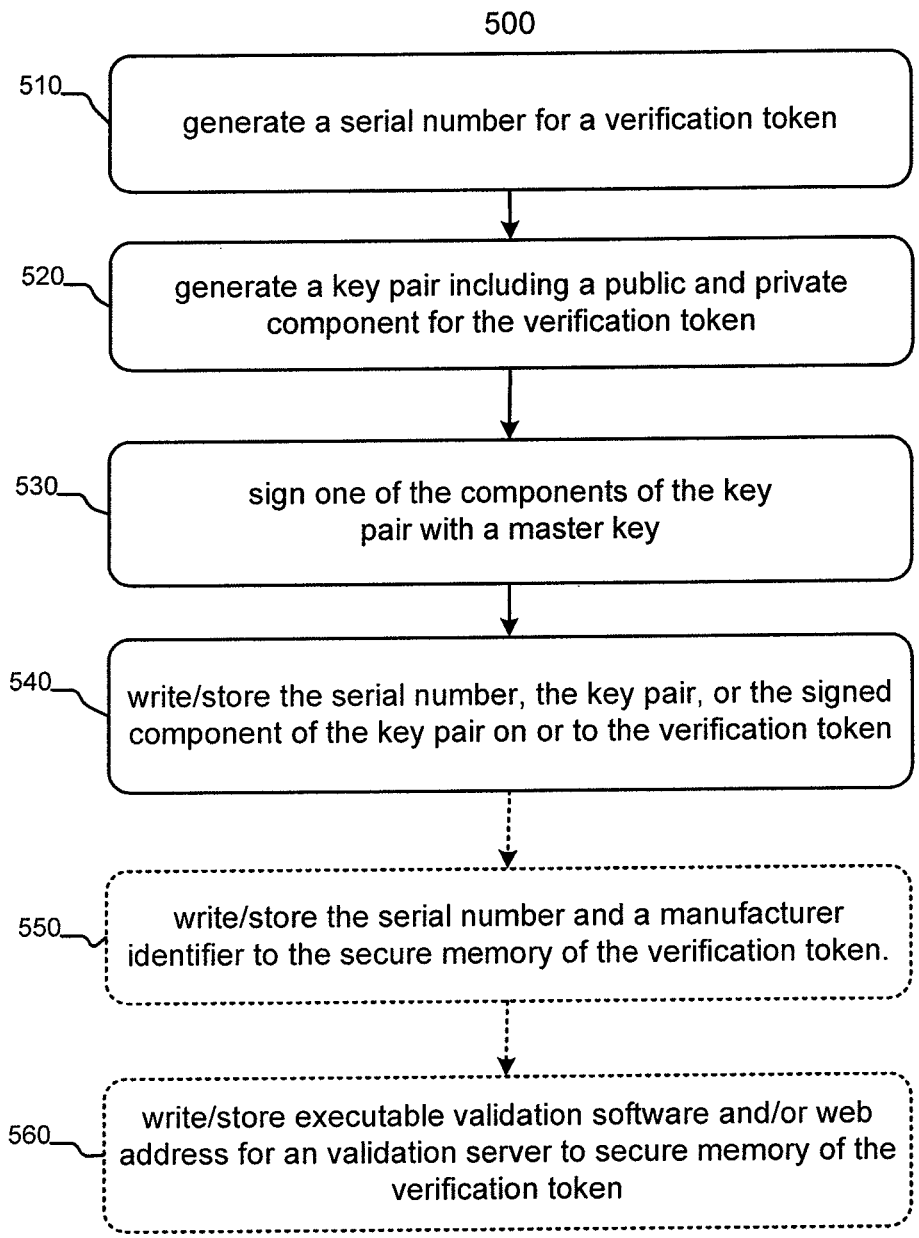
FIG. 5 is a flowchart of a method for producing verification tokens according to various embodiments of the present invention.

Once a manufacturer is registered, it can begin creating verification tokens. FIG. 5 is a flowchart of a method 500 for making verification tokens according to an embodiment of the present invention. The method 500 can be performed by a verification token manufacturer that is registered with or otherwise approved by a validation entity/server. For each verification token, the verification token manufacturer can generate or produce a serial number in action 510. In some embodiments, the serial numbers can be generated or otherwise selected from set of serial numbers assigned to the verification token manufacturer. In such embodiments, the set of serial numbers can be represented by a finite set of numbers, an algorithm for producing random or quasi random serial numbers or other methodology for producing serial numbers that may or may not be associated with the verification token manufacturer. In embodiments in which the set of serial numbers are associated with the verification token manufacturer, the validation entity/server 80 can use the verification token serial number to determine the verification token manufacturer and/or verification token specific information, such as verification token specific key pairs or verification token a manufacturer master key (KMC) or certificate that can be used for encrypting or decrypting information sent between the verification token manufacturer and verification token.

Some embodiments can use a PKCS standard certificate requirement, the certificate/signature can include (1) a verification token serial number and (2) a manufacturer name or identifier. Additionally, the manufacturer can derive a key based on the KMC and the verification token serial number and these can be stored in computer readable medium 42 on the verification token. The verification tokens can then be shipped and distributed.

At action 520, the verification token manufacturer can generate a key pair for each verification token it manufacturers or issues. The key pair can include a public and private component. The key pair can be a symmetric or an asymmetric key pair. The key pair can be verification token specific and unique to the verification token manufacturer that made the verification token. In other embodiments, the key pair for a particular verification token can be unique across all verification tokens, independent of the verification token manufacturer that made the verification token.

For an additional level of security, each component of the verification token key pair written to or stored on the verification token can be signed by a master or CA certificate or private key at action 530 to create verification token public certificate. Specifically, the verification token public key can be signed by the verification token manufacturer's private key. In such embodiments, the verification token public certificate can include the verification token serial number or other identifier.

In some embodiments, the master or CA root key is associated with the verification token manufacturer, while in other embodiments, the master or CA root key can be associated with a validation entity/server. In such embodiments, the master or CA root key signed public component of the verification token key pair can be verified and/or decrypted by a validation entity/server.

Once the key pair, serial number and/or the public key certificate are generated for the verification token, all or some components of the key pair, serial number and/or the public certificate can be stored or written to a memory in the verification token in action 540. Similarly, the verification token public certificate and/or the manufacturer public key can also be stored on the verification token. In some embodiments, only one component of the key pair is stored or written on the verification token. In such embodiments, it is advantageous to write and/or store the public component or the signed public component of the key pair to the verification token, while keeping the private component secret. Storing the key pair components, or other information, to the verification token can include storing information to a memory or secure memory.

Once the key pair is generated and written to or stored to the verification token, the private components of the key pair can be shared between the verification token manufacturer, the validation entity/server or other trusted entity. In some embodiments, the shared information can include an association of the key pair to the serial number, the verification manufacturer or a verification token manufacturer identifier.

Optionally, the serial number and a manufacturer identifier can be stored/written to the memory on the verification token in action 550. Finally, in action 560, the verification token manufacturer can also write/store executable validation software and or a web address for authentication validation server to the memory or secure memory of the verification token. The executable software code can include instructions for directing a processor in a computer to which the verification token can be connected to initiate each communication session over a communication medium via the computers communication facility to validate the verification token.

Figure 6:
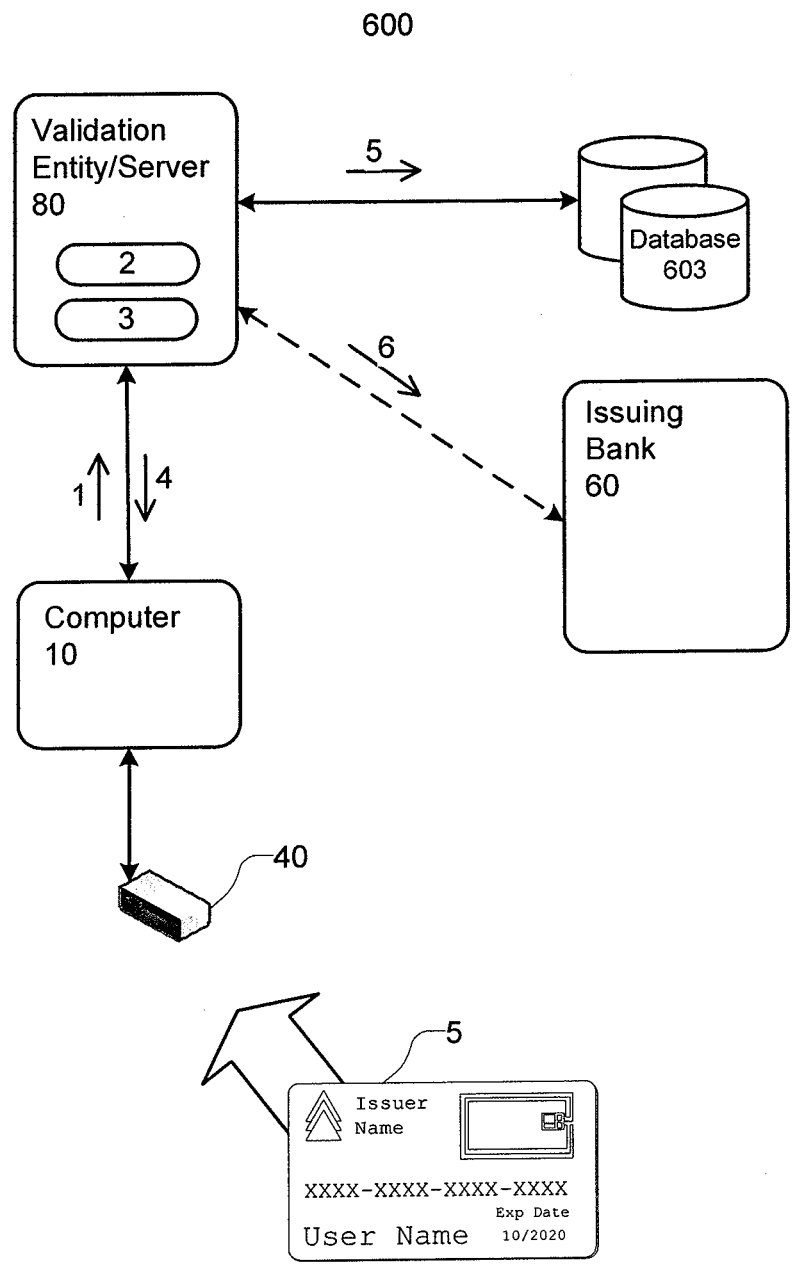
FIG. 6 is a schematic of a system for validating verification tokens according to various embodiments of the present invention.

Whenever a user chooses, but especially on receipt of a new verification token, he or she can initiate one or more processes to register and/or validate the verification token. FIG. 6 is a schematic of a system 600 that can be used to validate and/or authenticate a verification token 40. Before portable consumer device 5 is presented to verification token 40 to initiate a transaction, the user can be required to or choose to first validate and/or authenticate verification token 40 to validation entity/server 80.

In some embodiments, to validate verification token 40 the user can (1) logon to a website operated by the validation entity/server 80; (2) using HTTPS or other security protocol, the website can instruct the user to insert the verification token if the user has not already done so; (3) the website can request and validate the verification token certification or key pair/key pair components using the manufacturer's key; (4) then the website can generate a random number and request the verification token to sign this number; (5) the website can validate the signature and display a message to the user that the verification token is valid; and (6) the website can also display the verification token serial number which can be etched onto the verification token itself.

In other embodiments, the user can ne instructed to go to a validation website. The prompt can come in the form of a letter, an email, an SMS or by an executable code or static file stored on the verification token. The instruction may or may not include a hyperlink to the website. It is advantageous for the instruction to not include a hyperlink or URL and simply a message that instructs the user to logon to a trusted website at which the user may already have a registered account. This manual aspect of navigating to the validation website helps prevent fraudsters or makers of fraudulent verification tokens from directing users to a fake or fraudulent website and fooling the users into "validating" the fraudulent verification token with the fake website to skim sensitive user information. While viewing the validation website, the user can be prompted to enter a random or semi-random number. The random number may be generated by the validation server, the website, the user's computer, the verification token or simply be a number of the user's choosing.

The random number can then be sent to verification token reader and signed by one of the verification token's keys, i.e. the private key. The reader can then return the signed number, the reader public certificate and the manufacturer public key certificate to validation server/entity 80. The validation server/entity 80 can then validate then manufacturer public key certificate using the validation server/entity 80's root or master key. The validation server/entity 80 can also extract and validate the reader public key using the manufacturer public key. The validation server/entity 80 can then validate the serial number and the manufacturer name or identifier against the registry of authenticated or registered verification token manufacturers. Finally, the validation server/entity 80 can validate the singed random number using the verification token public key.

In another embodiment, the user can connect verification token 40 to computer 10 via a peripheral interface. Once connected to computer 10, verification token 40 can automatically or at the prompt of the user initiate one or more segments of executable code using the processor of computer 10 or a processor built into verification token 40. In either of such embodiments, computer 10 can send a validation request to validation entity/server 80 using its communications facilities over a communication medium such as the Internet, in action 1. The validation request can include various public and secret information regarding verification token 40. For example, the validation request can include the public component of the verification token 40 specific key pair, the serial number of verification token 40, a random number generated and or signed by verification token 40 or computer 10 or a challenge inquiry.

The validation entity/server 80 can receive the validation request from computer 10 in action 2. Validation entity/server 80 can receive the validation request over any suitable communication medium connecting computer 10 validation entity/server 80. In some embodiments, validation entity/server 80 can parse various pieces of information from the validation request. For example, validation entity/server 80 can parse the public component of the verification token 40 specific key pair, the serial number of verification token 40, a random number generated and or signed by verification token 40 or computer 10 or a challenge inquiry. Based on the information parsed from the validation request, validation/server 80 can retrieve or otherwise produce information associated with verification token 40.

For example, validation entity/server 80 can use the serial number of validation token 40 to produce, determine and/or retrieve a private component of a key pair associated with verification token 40. In other embodiments, validation entity/server 80 can use a manufacturer identifier parsed from the validation request to determine if the serial number in the validation request is consistent with serial numbers assigned to and/or produced by that verification token manufacturer. Validation entity/server 80 can use any and all information parsed from the validation request to retrieve any and all information associated with a particular verification token 40, verification token manufacturer or a user associated with the verification token 40.

In some embodiments, validation entity/server 80 can parse a verification token identifier or serial number for verification token 40 from the validation request in action 2. The validation entity/server 80 can check if the parsed verification token identifier or serial number has been previously validated in action 3. In some embodiments, if the parsed verification token identifier or serial number has previously been validated, validation entity/server 80 can return a validation message to computer 10 in action 4, at which point, the user can present a portable consumer device 5 to verification token 40 to initiate a transaction. In other embodiments, validation entity/server 80 can, along with the validation message, send verification token information update instruction.

In some embodiments, verification token information update instruction can include computer readable code for instructing the processor of computer 10 to rewrite some or all of the information stored on verification token 40. For example, one or more components of the key pair associated with verification token 40 can be replaced with the new components of a key pair newly associated with verification token 40. Updates to verification token information stored on verification token 40 may only be allowed or be restricted to validation entity/server 80 when it can establish a secure key session communication session.

In some embodiments, at action 3, validation entity/server 80 can perform a mutual authentication and establish a key session with computer 10. The key session between computer 10 and validation entity/server 80 can be established by validation entity/server 80 generating a random number or other challenge message, signing that random number or challenge message with the component of the key pair associated with the verification token 40 and sending the signed information back to the verification token 40. Verification token 40 can decrypt the signed information and send back the correct response according to the decryption using the component of the key pair stored on verification token 40.

In some embodiments, the component of the key pair stored on verification token 40 is signed by a master or CA root key associated with the verification token manufacturer or the validation entity/server 80. In such embodiments, the decrypted response received from verification token 40 must then be decrypted using the master or CA root key to further authenticate the authenticity of the verification token 40. In either such embodiments, validation entity/server server 80 can receive the response from verification token 40. Based on the response received from verification token 40, validation entity/server 80 can determine whether the verification token 40 is authentic, valid or otherwise produced by a trusted verification token manufacturer who has undergone and received authorization to produce verification tokens. If verification token 40 is determined to be valid, it can then be used with portable consumer device 5 to initiate transactions. A message to this effect can be sent to computer 10 from validation entity/server 80 to two further activate the verification token 40 or instruct computer 10 to subsequently use verification token 40 initiate a transaction, in action 4.

In the events that verification token 40 is determined to be fraudulent or otherwise invalid, that verification token, or any information associated with it, such as verification token serial number or ID, can be listed as a potentially fraudulent verification token and blocked from being used for transactions.

In the case that verification token 40 has not previously been validated by validation entity/server 80, validation entity/server 80 can store the newly validated verification token serial number or identifier into a database of 603 for later retrieval and confirmation of previous validation of verification token 40 in action 5. In some embodiments, validation entity/server 80 can inform issuing bank 60 that verification token 40 has either successfully been validated by validation entity/server 80 for initiating transactions using portable consumer device 5 in action 6. Alternatively, issuing bank 60 can be informed of a potentially fraudulent portable verification token has been attempt at being validated.

Methods, systems, and servers according to various embodiments of the present invention include advantages over existing means for deterring or stopping fraudsters from introducing fraudulent verification tokens into the stream of commerce to skim sensitive user information. Various embodiments of the present invention include multi-layer or multi-part validation schemes to prevent fraudsters from producing and validating fraudulent verification tokens that might fool a validation server/entity, thus further reducing the chance of skimming user information. For example, the manufacturer public certificate produced by the validation server/entity and stored on the verification token can help better ensure that the validation server/entity has had a previous authentication interaction with the maker of the particular verification token. Then only the validation server/entity that has access to the manufacturer-specific master or CA root key or master or CA root certificate can retrieve, decrypt or otherwise extract the verification token public key from the verification token public certificate using the manufacturer public key retrieved/generated based on the validation of the manufacturer public key certificate.

The manufacturer public key certificate, or means for generating one, i.e. the validation server/entity's master or CA root key or certificate, would not be available to an unauthenticated verification token manufacturer, and thus, such a fraudulent manufacturer could not generate a certificate that could be used to generate/validate an authentic verification token public certificate or verification token public key that would match the private key stored on the verification token. Without such information, a user who visits a trusted website to validate a verification token could not be fooled into validating a fraudulent, or otherwise unauthentic, verification token. These features greatly increase the security of verification tokens used for conducting financial and other transactions using portable consumer devices, i.e. credit and debit cards, initiated from a user terminal at a location separate from a merchant or other entity that might otherwise verify the authenticity of the portable consumer device or user. These features can further be enhanced by requiring the user manually or otherwise independently navigate to a website to initiate the validation process so as to curtail the possibility of a fraudulent verification token automatically navigating to a fraudulent validation website.

Figure 7:
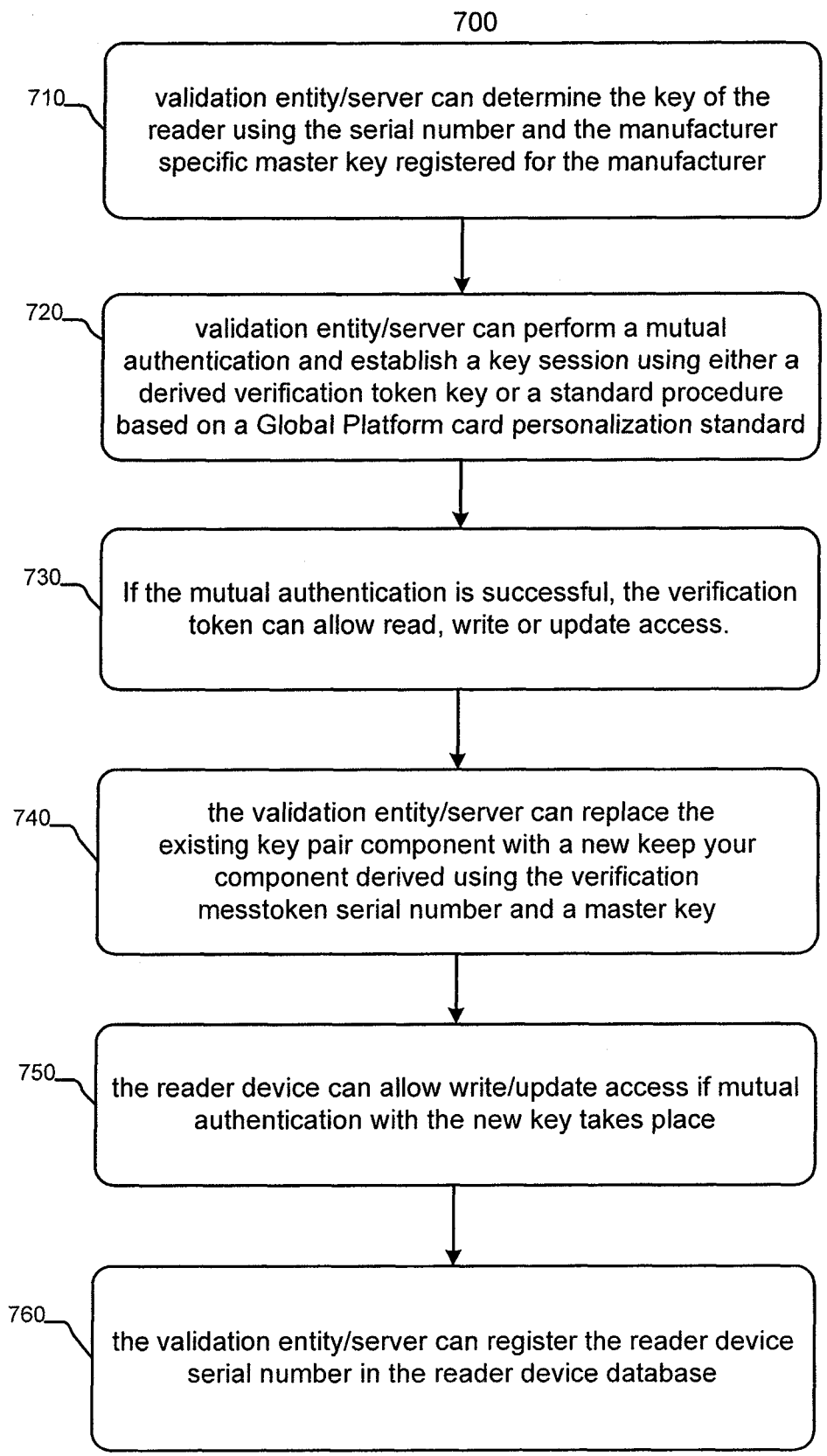
FIG. 7 is a flowchart of a method of validating verification tokens according to various embodiments of the present invention.

FIG. 7 is a flow chart of a method 700 for performing a first time use or registration of a verification token. During the process described above, the validation entity/server can check whether the verification token has been previously validated. If the serial number is not in a database of previously validated verification tokens, the following procedure can be performed prior to first time use.

In action 710 the validation entity/server can derive the key of the verification token using the serial number and the master or CA root key registered at the validation entity/server for that verification token manufacturer. At action 720, the validation entity/server can perform a mutual authentication and establish a session key using either a derived verification token key or a standard procedure based on Global Platform SCP01 or 02 or EMVco card personalization standard. Next, in action 730, if the mutual authentication is successful, then the verification token can allow read, write and update access.

At action 740, under the session key, the validation entity/server can replace the existing key component stored on the verification token with a new key component derived using the verification token serial number and a master key (MDK). Any other needed data can be written at this point and the user can optionally register at this time. In action 750, the verification token can allow write/update access if mutual authentication with the new key component takes place. Finally, in action 760, the validation entity/server can register the verification token serial number in the verification token database.

The response to an initial or first validation request can be a first validation or registration test to validate verification token 40. To initiate the validation or registration request, verification token 40 can send its serial number to validation entity/server 80, along with a message or validation request encrypted by a key, with the message and key being a secret shared between verification token 40 and validation entity/server 80 (i.e. not publically known). In some embodiments, the key can be uniquely associated to the token's serial number. The key can be an encryption key that includes a symmetric or an asymmetric key pair.

Validation entity/server 80 can have or have access to a database of serial numbers and the corresponding associated keys or stored algorithms for generating the keys, and can validate that verification token 40 has sent the correct message for the serial number. For this, verification token 40 may comprise a serial number and unique key embodied in a computer-readable medium or memory, the unique key being unique to verification token 40, and code that directs data processor 41 to send the serial number and a message encrypted by the unique key to validation entity/server 80.

The message may be pre-stored on the computer-readable medium, or derivable/determinable from information known to both verification token 40 and validation entity/server 80, such as a message derived from an algorithm applied to the current date, serial number of token 40, and/or session key of the communication session between token 40 and validation entity/server 80. In this manner, the message sent by token 40 to validation entity/server 80 is verifiable by validation entity/server 80 using information stored at the validation entity. The computer-readable medium or memory for the above tasks may be located in computer-readable medium 42 and/or security module 43. The above codes may include I/O instructions to security module 43, and function calls to the API of the computer's network services module.

Optionally, verification token 40 can send, from time to time, one or more pieces of machine-unique information of computer 10 to validation entity/server 80, which may check this information against a database of computer information associated with known fraudsters. Such machine-unique information may include the serial numbers of processors, disk drives, and operating systems of computer 10. Verification token 40 may comprise code that directs data processor 41 to obtain one or more pieces of machine-unique information from computer 10, and to send the machine-specific information to validation entity/server 80. This code may include function calls to the API of the computer's operating system to obtain the information, and function calls to the API of the computer's network services module to send the information to validation entity/server 80.

As another option, verification token 40 may be configured to prompt user 1 for a password to activate one or more features of token 40. The password may be stored on a computer-readable medium located in security module 43 or in computer-readable medium 42. The password may be provided to user 1 on a piece of paper by verification token manufacturer, provider or seller of token 40. Token 40 may be sent to user 1 through the mail by or on behalf of an issuing bank, or may be purchased by user 1 in a store. Token 40 may be configured to require that the password be entered each time the user wishes to present a portable consumer device 5, and/or each time token 40 is coupled to a computer 10. For this, verification token 40 may further comprise code embodied on computer-readable medium 42 that directs data processor 41 to prompt the user to enter a password on a keyboard of computer 10, to read a password entered by the user, and to compare the entered password against a stored password embodied on the computer-readable medium. This code may comprise API function calls to the graphical user interface of the operating system of computer 10 to open a display box on user interface 13 to request and receive a password from user 1, I/O instructions, memory access instructions, and CPU logical and control instructions. Verification token 40 may further comprise one or more of the following:

(1) code embodied on computer-readable medium 42 that directs data processor 41 to initiate and/or allow the above-described communications with computer 10 in response to an entered password matching the stored password;

(2) code embodied on computer-readable medium 42 that directs data processor 41 to initiate and/or allow the above-described communications with validation entity/server 80 in response to an entered password matching the stored password;

(3) code embodied on computer-readable medium 42 that directs data processor 41 to activate reader 44 and/or to accept identification information from reader 44 in response to an entered password matching the stored password; and (4) code embodied on computer-readable medium 42 that directs data processor 41 to initiate and/or allow the above-described transmission of identification information to validation entity/server 80 in response to entered password matching the stored password.

These codes can include I/O instructions, memory access instructions, and CPU logical and control instructions. The instructions, alone or in combination, prevent the transmission of identification information to validation entity/server 80 when the entered password is not the same as the stored password, and thereby comprise code embodied on the computer-readable medium that directs the data processor for doing so. One of ordinary skill in the art will be able to construct the instructions and API function calls to implement the above-described codes in view of this disclosure without undue experimentation. As further protection, validation token 40 may further comprise code embodied on computer-readable medium 42 that directs data processor 41 to establish a user name for the token by presenting user 1 with a dialog box to receive input designating a username, and by storing the username in computer readable medium 42.

The above codes for processing the password may be further augmented to include requesting a username for the token and comparing the received username with the stored username for a match, and including a match as a condition that must be met in each of the four above codes that initiate or allow various actions to be done. These codes can include I/O instructions, memory access instructions, and CPU logical and control instructions.

In each of the embodiments described herein pertaining to verification token 40, verification token 40 can send the identification information pertaining to portable consumer device 5 to computer 10 in a number of forms, including: (1) unaltered form ("clear form"), (2) encrypted form, (3) hashed formed (e.g., encoded), (4) signed form, (5) or any combination of these forms. These forms may be generated by portable consumer device 5, verification token 40, computer 10, or any combination thereof. In addition, verification token 40 and validation entity/server 80 may perform a mutual authentication process before verification token 40 sends the identification information.

In each of the embodiments described herein pertaining to verification token 40, the above codes of token 40 and the identification information read from device 5 by token 40 may be stored independently of computer 10 and may be secure from programs (including spyware and other malicious programs) running on computer 10. In such implementations, the identification information is put in secure form (e.g., encrypted, hashed, signed, or combination thereof) by verification token 40 before the information is provided to computer 10.

Accordingly, securing the information is not dependent upon the security of computer 10. Symmetric or asymmetric keys may be used for encryption and signing. The keys for a verification token 40 may be unique with respect to other verification tokens (that is, the keys for a token may be unique to that token). Keys for a token, and particularly symmetric keys, may be based upon a uniquely assigned serial number for the verification token, which the token can communicate to validation entity/server 80 in an initial communication. Both the verification token and the validation entity/server may have a shared secret on how to derive a key from the token's serial number, such as by manipulating and/or replacing selected digits of the serial number. A number of keys may be derived from the unique serial number using respective shared secrets. Thus, the challenge and response messages used in a mutual authentication process between a verification token and a validation entity/server may be signed using respective keys derived from the serial number of the verification token.

Figure 8:
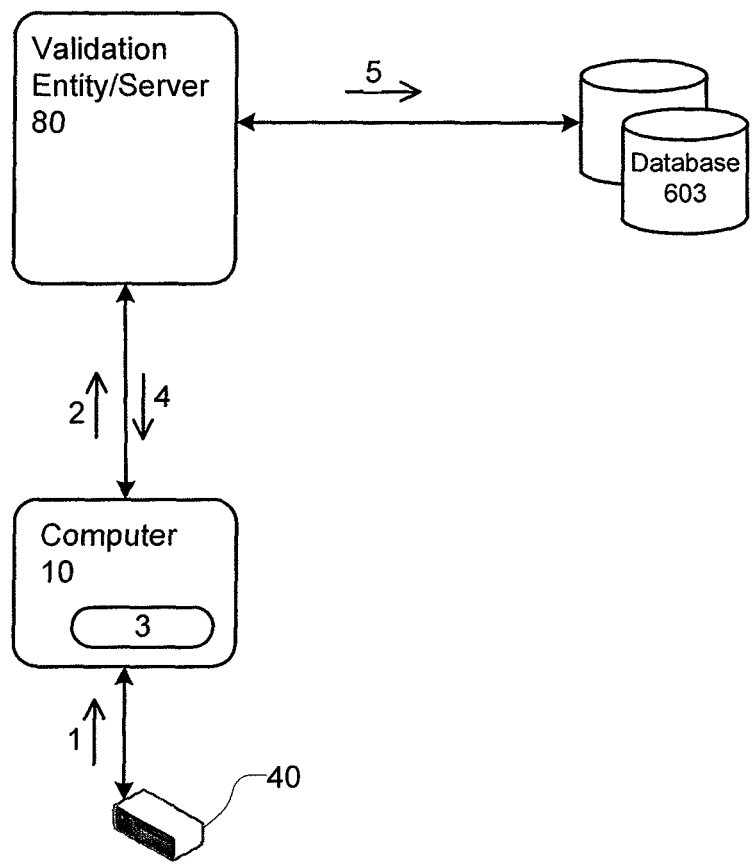
FIG. 8 is a schematic of a system for validating verification tokens according to various embodiments of the present invention.
Figure 9:
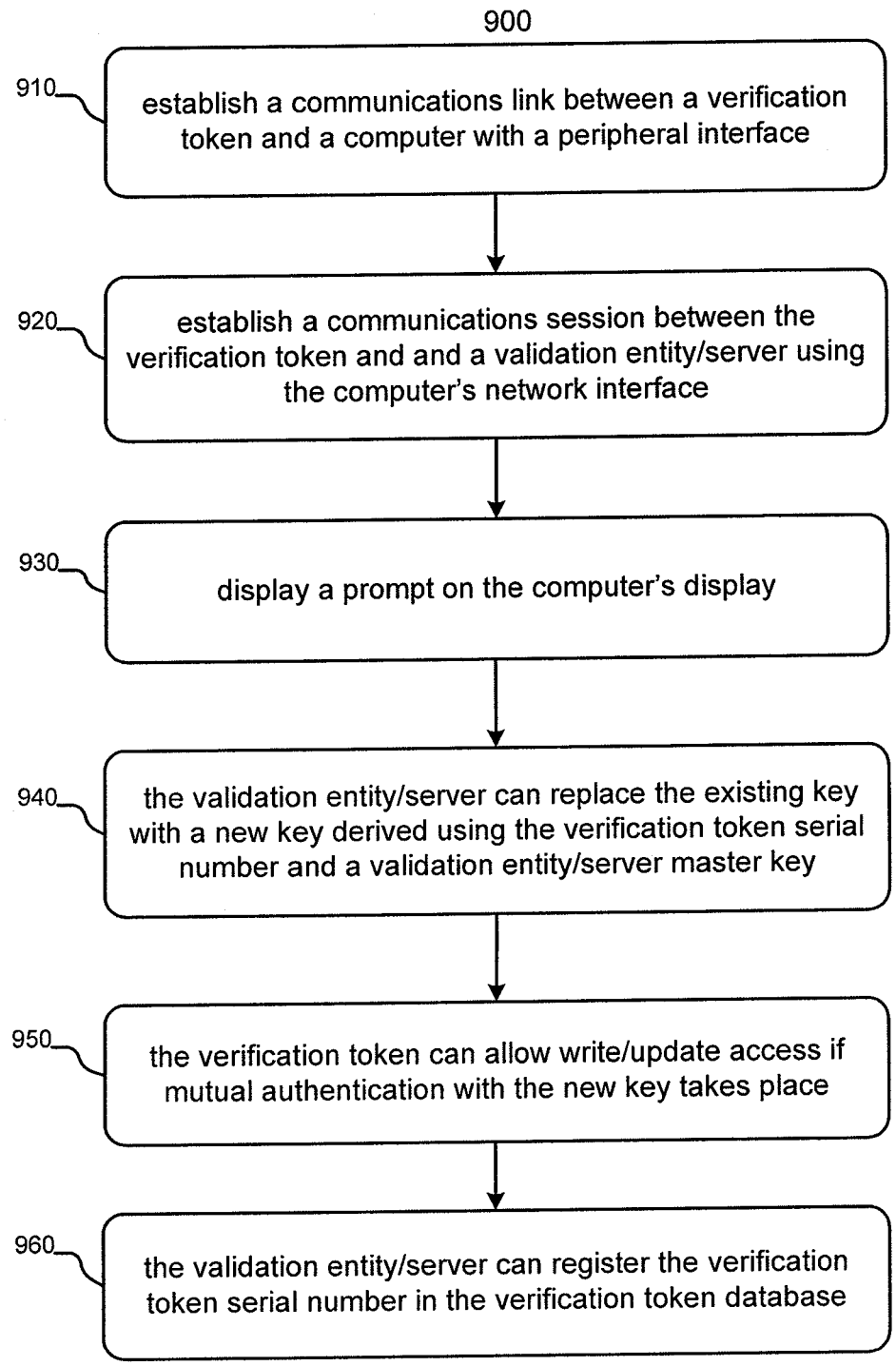
FIG. 9 is a flowchart of a method of validating verification tokens according to various embodiments of the present invention.

FIG. 8 is a schematic of a system for updating information stored in a computer readable medium or memory on verification token 40. In action 1, verification token 40 can be connected to computer 10 via a user. Once verification token 40 is connected to computer 10, via a peripheral interface or other communication interface, verification token 40 can establish a communications link with computer 10. In some embodiments, the peripheral interface can include a USB or FireWire™ interface as well as any other peripheral or internal bus interface suitable for establishing communication and transferring information between verification token 40 and computer 10.

Using the communication link between the verification token 40 and computer 10, verification token 40, or processor included there on, can instruct computer 10 to establish a communication session between the verification token and a validation entity/server using computer tens network interface in action 920. In such embodiments, the network interface/facility computer 10 can be connected over communication medium such as a private computer network or the Internet. In such embodiments, verification token 40 can comprise executable code that includes instructions for the processor of verification token 40 or the processor of computer 10 to establish communication using computer 10's network interface. In some embodiments, the code can include a URL or other address for contacting a website or other service operated by validation entity/server 80.

Once the communication link between the verification token 40 and the validation entity/server 80 is established, computer 10 can download executable code from validation server entity server 80 that includes instructions to provide a user with various prompts on computer 10's display in action 930. The executable code can include HTML or other universally executable code on a computer using a web browser or other web-based communication application. The prompts for the user can include instructions for the user for initiating, continuing or completing a validation request of the verification token 40. Example, computer 10 can prompt the user to enter the serial number of verification token 40 printed on the exterior of verification token 40. In some embodiments, the serial number printed, etched or engraved on the verification token 40 is the same as a serial number stored in the computer readable medium or memory on the verification token 40. In other embodiments, the serial number printed, etched or engraved on the verification token 40 is different from or a variation of a serial number stored in the computer readable medium or memory on the verification token 40.

If the user enters the proper input to the prompt(s) and the input, or an encrypted version of the input, matches the information stored on the verification token 40 and/or the validation entity/server 80, then a key session can be established between verification token 40 and validation entity/server 80. In some embodiments, the input in response to the prompt can include a password known only to the authorized user(s) and the validation entity/server 80, while in other embodiments, the input in response to the prompt can include some or all of the serial number read from the exterior or the memory of the verification token 40. Once the key session is established, the validation entity/server 80 can initiate replacing the existing or original key derived from the verification token serial number and/or the validation entity/server master key or certificate in action 940. If, under the key session, the verification token 40 and the validation entity/server 80 can perform a mutual authentication, then the verification token can allow the validation entity/server 80 to replace the original key with a new key in action 950. In some embodiments, the user can be prompted to allow or deny the replacement of the existing key on the verification token 40 with the new key from the validation e entity/server 80. Finally, the validation entity/server 80 can register the serial number of verification token 40 with the verification token database for future reference and verification token 40 summits another validation request from time to time in step 960. The verification token database can include associations between the original serial number, the original key, and each iteration or replacement key is or has been associated with verification token 40.

Figure 10:
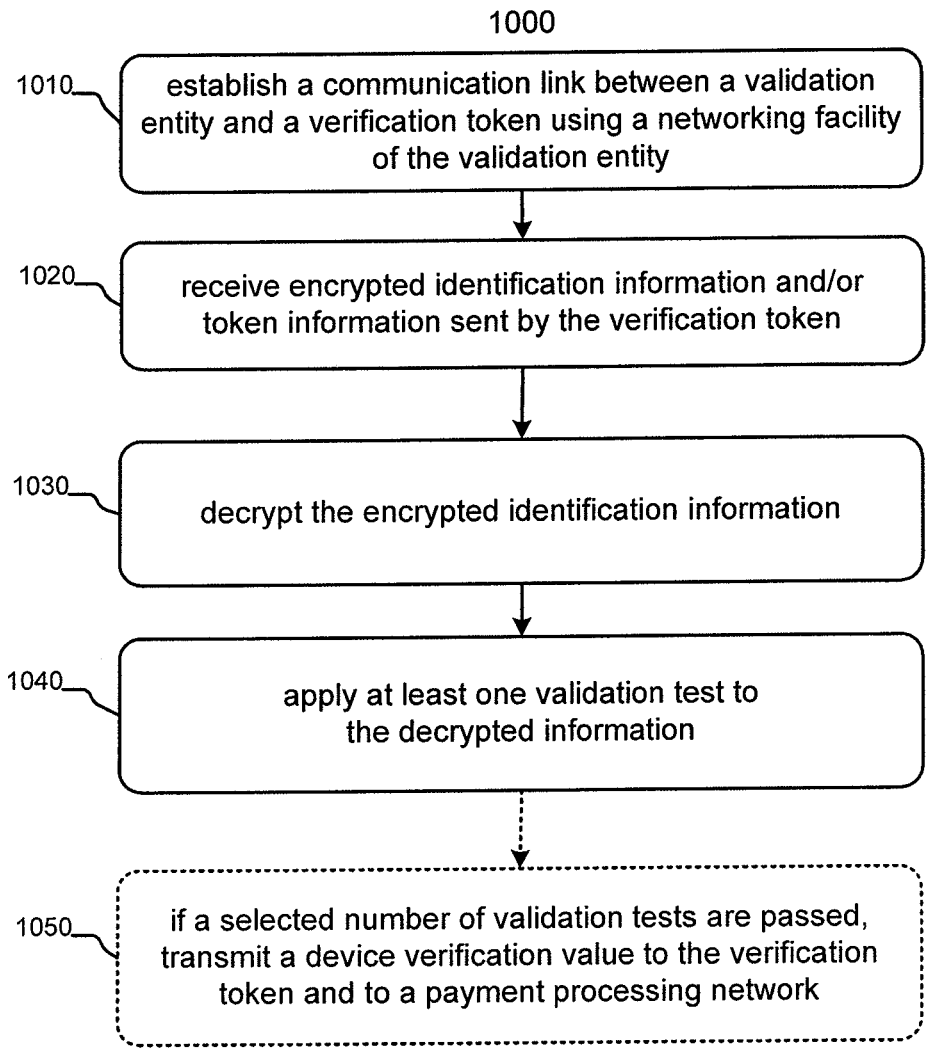
FIG. 10 is a flowchart of a method of validating verification tokens according to various embodiments of the present invention.

FIG. 10 is a flowchart of a method 1000 of a method for using a validation entity/server 80 to validate a verification token 40 according to various embodiments of the present invention. Method 1000 begins at action 1010, in which the validation entity/server 80 establishes a communication link with a verification token using a networking facility of the validation entity/server 80. In some embodiments, the communication link is established between validation entities/server 80 and computer 10 to which the verification token 40 is connected. In other embodiments, verification token 40 validation entity/server 80 are connected directly over a physical connection or a wireless connection, such as WiFi™, Bluetooth™, GSM, CDMA, 3G, 4G, or other wireless data or communication protocol. Over the established communication link, validation entity/server 80 can receive an encrypted identification information and/or verification token information sent by a verification token 40 at action 1020. As described above, the encrypted or unencrypted identification information and/or verification token information can include a serial number, authentication message, a verification token manufacturer identifier and any other information that can be used by validation entity/server 80 to perform a mutual authentication with the verification token 40.

In action 1030, the validation entity/server 80 can parse or decrypt the received identification information and/or verification token information. To parse the received information, the validation entity/server 80 can use information associated with the verification token from which the information was received. In some embodiments, the information associated with the verification token includes a delimitation key that indicates to the validation entity/server how to parse the received information into constituent data segments. For example, the associated information can include a list of constituent data segments, delimiters, and the form of the data, i.e. a comma delimited table of strings. In other embodiments, the information associated with the verification token can include a corresponding symmetric or asymmetric key mate to a key stored on or sent from the verification token. The associated information can also include a manufacturer specific master key that was used to sign the key component stored on the verification token. The master key can be used, in conjunction with the corresponding key component associated with the verification token not stored on the verification token, to decrypt any information signed by the key component stored on the verification token.

The validation entity/server can apply at least one of validation tests discussed above to the decrypted information in step 1040. Based on the results of the validation test or tests, the validation entity/server can verification value/message to the verification token. If the tests are passed or otherwise deemed satisfactory, then the verification value/message can indicate to the verification token that the validation entity/server is trusted and should be allowed access to the read, write or replace information stored on the verification token. In other embodiments, the verification value/message can include information that can be used to add to, amend or replace information stored on the verification token. In various embodiments, a processor included in the verification token or the computer to which it is connected can initiate the read, write or replacement of information stored on the verification token. In such embodiments, information can include a replacement or new key component that can be used for future transactions and validation request sent using the verification token. In corresponding embodiments, the replacement or new key component and the corresponding new key component, i.e. symmetric or asymmetric key pairs, can be stored for future reference in validation or transaction requests.

Having described various embodiments and implementations of verification token 40, various embodiments and implementations of validation entity/server are now described. Validation entity/server 80 comprises a system having one or more servers coupled to a communications network that can receive a request from a verification token 40 to process (e.g., to validate) the verification token information and information that the token has read from a portable consumer device 5, and to provide a device verification value (dCVV2) to the token and to payment processing network 70 if the identification information passes one or more validation tests.

One exemplary server of validation entity/server 80 is shown in FIG. 1. The server comprises one or more processors 81 coupled to each of a tangible computer-readable medium 82, a user interface 83, one or more databases 86, and a networking facility 84, the latter of which is coupled to first and second communications networks 31 and 32. User interface 83 comprises one or more video output devices (e.g., displays, screens) and one or more input devices (e.g., keyboard, mouse, trackball, etc.), which enable an administrator of validation entity/server 80 to receive information from the server and to provide input to the server. Computer-readable medium 82 may comprise a combination of semiconductor memory and non-volatile storage, such as one or more disk drives and/or non-volatile memory.

Computer-readable medium 82 stores an operating system for the server, which enables processes and applications to be run by processor(s) 81, and enables codes for directing the operation of processor(s) 81 to be run. The operating system provides services to these processes and applications, and enables these processes and applications to access components of user interface 83, portions of computer-readable medium 82, networking facility 84, and other components of validation entity/server 80.

The operating system may be full featured. Specifically, the operating system provides one or more I/O communications modules that enable processor(s) 81 to communicate with user interface 83 and databases 86. Each I/O communications module has an application programming interface (API) with a collection of functions that a processor 81 can call in order to access the components. The operating system of validation entity/server 80 can also comprise one or more network services modules that can access networking facility 84 and set up communication sessions to entities on communications networks 31 and 32, and with SMS relay server 35. Such network services modules include Microsoft's Windows Communications Foundation (e.g., .NET 3.0, .NET 4.0, etc.), Apple's CFNetwork Framework, the networking section of the Unix and Linux operating system kernels, and the OS Services Layer and the Base Services Layer of the Symbian™ operating system, and the like. Each of these network services modules can be non-exclusive (e.g., capable of serving more than one processor and more than one process/application) and each provides an application programming interface (API), which has a collection of functions that a processor 81 can call in order to manage communications with another entity. With these API facilities, a collection of API function calls can be readily constructed for a processor to execute that enables the processor to establish a communications channel with an entity on a communications network coupled to networking facility 84, and to exchange messages and data with the entity. The above operating system, modules, and APIs all include instructions that direct the operation of processor(s) 81.

One or more databases 86 may be configured as database servers, which processor(s) 81 can access via networking facility 84 over a private communications network 87, which is illustrated by the dashed line in FIG. 1. Validation entity/ server 80 conventionally has a clock 88 for tracking time and dates for various applications. Clock 88 may be a simple counter of seconds, or fractions thereof, that can be read by processor 81 by an I/O operation, or may comprise a more complex arrangement of hardware or firmware that can provide the various components of the current date and time (year, month, day, hour, minute, and second) in various registers that can be read by processor 81 through the execution of one or more I/O operations.

Validation entity/server 80 can process identification information transmitted from a plurality of different verification tokens 40 (e.g.; millions of tokens), and can process any number of transmissions by a particular token 40. Validation entity/server 80 applies one or more validation tests to verification token 40. For these tasks, validation entity/server 80 may comprise code embodied on computer-readable medium 82 that directs data processor 81 to communicate with computer 10 and verification token 40 using networking facility 84 over communications network 31. This code may include instructions that establish a communications session with computer 10, including the option of establishing an SSL session with mutual authentication and encryption based on a triple DES algorithm, and instructions for sending and receiving messages to verification token 40 through the communications session.

Validation entity/server 80 may further comprise code embodied on computer-readable medium 82 that directs data processor 81 to receive encrypted identification information sent by verification token 40, and code that directs data processor 81 to decrypt the encrypted identification information. The identification information may be encrypted by a session key of an SSL session or by an encryption key stored in verification token 40 and known to validation entity/server 80, or may be doubly encrypted by both keys. The latter key may be uniquely assigned to the token. Validation entity/server 80 may further comprise code embodied on computer-readable medium 82 that directs data processor 81 to apply one or more validation tests as previously described above. Data processor 81 may access databases 86 in performing the one or more validation tests. The validation tests and codes therefore are described below in greater detail. These codes and codes described below for validation entity/server 80 may be implemented in any number of programming languages. Furthermore, one of ordinary skill in the art will be readily able to construct instructions to implement these codes in view of this disclosure without undue experimentation.

As described above, a first validation test that validation entity/server 80 may apply pertains to verifying that verification token 40 is authentic. For this, verification token 40 may send its serial number to validation entity/server 80, along with a test message encrypted by an encryption key, with the test message and encryption key being known to token 40 and validation entity/server 80 (but not the general public), and with the encryption key further being uniquely assigned to the token's serial number.

Validation entity/server 80 may access a database of token serial numbers and corresponding uniquely-associated encryption keys in one of databases 86, and may determine whether verification token 40 has sent a correct test message for the serial number that the token provided. The test message may be fixed or variable; in the latter case it may be generated based on information known to both token 40 and validation entity/server 80. The test message may be encrypted and decrypted by a triple DES algorithm, which can be implemented by a number of well known sets of computer instructions.

If the sent test message is correct, the first validation test can be deemed to have been passed. For this, validation entity/server 80 may comprise code embodied on computer-readable medium 82 that directs data processor 81 to receive one or more messages from verification token 40 via networking facility 84 that has the token's serial number and encrypted test message, code that directs data processor 81 to decrypt the encrypted test message, code that directs data processor 81 to obtain one or more acceptable messages that can be accepted as the correct test message from one of databases 86, and code that directs data processor 81 to compare the decrypted test message to the one or more acceptable messages to determine if the first validation test has been passed (in the case of a match between the decrypted test message and an acceptable message), or has been failed (in the case of no such match). An acceptable message may be obtained by accessing it directly from one of databases 86, or by generating it from information stored in one or more of databases 86. The above codes can be implemented with conventional I/O instructions, API function calls to databases, memory access instructions, CPU arithmetic and logic instructions, and CPU control instructions. In view of this disclosure, the codes may be implemented by one of ordinary skill in the art without undue experimentation.

As a second validation test, validation entity/server 80 may have a database in databases 86 that tracks the serial numbers of verification tokens that have been used in fraudulent activities, and validation entity/server 80 may check the serial number of verification token 40 against this database. If a check of this database indicates that verification token 40 has not been involved in fraudulent activity, the second validation test can be deemed to have been passed.

To implement the second validation test, validation entity/server 80 may comprise code embodied on computer-readable medium 82 that directs data processor 81 to receive a message from verification token 40 via networking facility 84 that has the token's serial number, code that directs data processor 81 to have the received serial number compared with serial numbers stored in a database of databases 86 that stores serial numbers of tokens used in fraudulent transactions to determine if the second validation test has been passed (no fraudulent activity), or has been failed (fraudulent activity). The above codes can be implemented with conventional I/O instructions, API function calls to databases, memory access instructions, CPU logic instructions, and CPU control instructions. In view of this disclosure, the codes may be implemented by one of ordinary skill in the art without undue experimentation.

As a third validation test, validation entity/server 80 may send a message to verification token 40 requesting that token 40 send it one or more pieces of computer-specific information about computer 10, such as the serial numbers of one or more of the following: the computer's processor, one or more of the computer's disk drives, the computer's operating system. Validation entity/server 80 may receive this information and check it against a database storing computer-specific information of computers known to have been involved in fraudulent activity. If a check of this database indicates that the computer 10 used by verification token 40 has not been involved in fraudulent activity, the third validation test can be deemed to have been passed.

To implement the third validation test, validation entity/server 80 may comprise code embodied on computer-readable medium 82 that directs data processor 81 to send a message to verification token 40 requesting computer-specific information (if verification token 40 has not sent such information beforehand without prompting), code that directs data processor 81 to receive one or more data messages from verification token 40 via networking facility 84 that have the token's serial number and the computer-specific information, and code that directs data processor 81 to have the received computer-specific information compared with computer-specific information stored in a database (of databases 86) that stores computer-specific information of computers used in fraudulent transactions to determine if the third validation test has been passed (no fraudulent activity), or has been failed (fraudulent activity). The above codes can be implemented with conventional I/O instructions, API function calls to databases, memory access instructions, CPU logic instructions, and CPU control instructions. In view of this disclosure, the codes may be implemented by one of ordinary skill in the art without undue experimentation.

Validation entity/server 80 may comprise a website accessible to the user 1 that enables the user: (1) to create a password-protected account associated with the serial number of the token, the latter of which may be provided on a slip of paper originally sent with the token; (2) to associate an e-mail address to be used for one or more of the above-described alerts; (3) to associate a mobile number and/or URID (e.g., network address) of the user's communications device 5 to be used for one or more of the above-described alerts; and (4) to select one or more of the above-described alert conditions. The website may also enable the user to provide and associate the account numbers for one or more of the user's devices 5 with the password-protected account, and may further enable the user to associate the e-mails and mobile numbers for the alerts to particular devices 5 according to their account numbers. One of databases 86 may be assigned to hold the password-protected accounts of the users. When validation entity/server 80 receives a validation request from verification token 40, it can query this database to find the user's password-protected account (e.g., identify the user from the token's serial number and/or the account number sent in the identification information), and determine what text message alerts are to be generated and sent based on the parameters stored in the password-protected account. The above codes and actions can be implemented with HTML page codes (e.g., web pages), conventional I/O instructions, memory access instructions, database API function calls, CPU arithmetic instructions, CPU logic instructions, and CPU control instructions. In view of this disclosure, the codes may be implemented by one of ordinary skill in the art without undue experimentation.

It may be appreciated that some implementations of verification token 40 may be configured to work with selected consumer payment devices 5, such as those issued by a selected bank, or configured to work with a selected merchant website 20.

In yet further implementations, verification token 40 may contain the URID of validation entity/server 80, which handles validation requests for several different co-branded portable consumer devices 5. In addition, each of these co-branded devices 5 may hold a URID to a co-branding merchant. The merchant URID is read by verification token 40 and provided to a validation entity/server along with the device's identification information. Validation entity/server 80 can send the validated identification information to the merchant URID.

Embodiments of the invention are not limited to authentication systems involving transactions. The same approach could be applied for other authentication systems. For example, embodiments could be used to authenticate a user using an online banking application. A cardholder may enter his user ID into a banking website. The cardholder can then present his or her portable consumer device to a verification token. The banking website can validate the User ID and the token credentials by communicating with a validation entity.

Embodiments of the invention are not limited to the above-described embodiments. For example, although separate functional blocks are shown for an issuer, payment processing system, and acquirer, some entities perform all of these functions and may be included in embodiments of invention.

Figure 11:
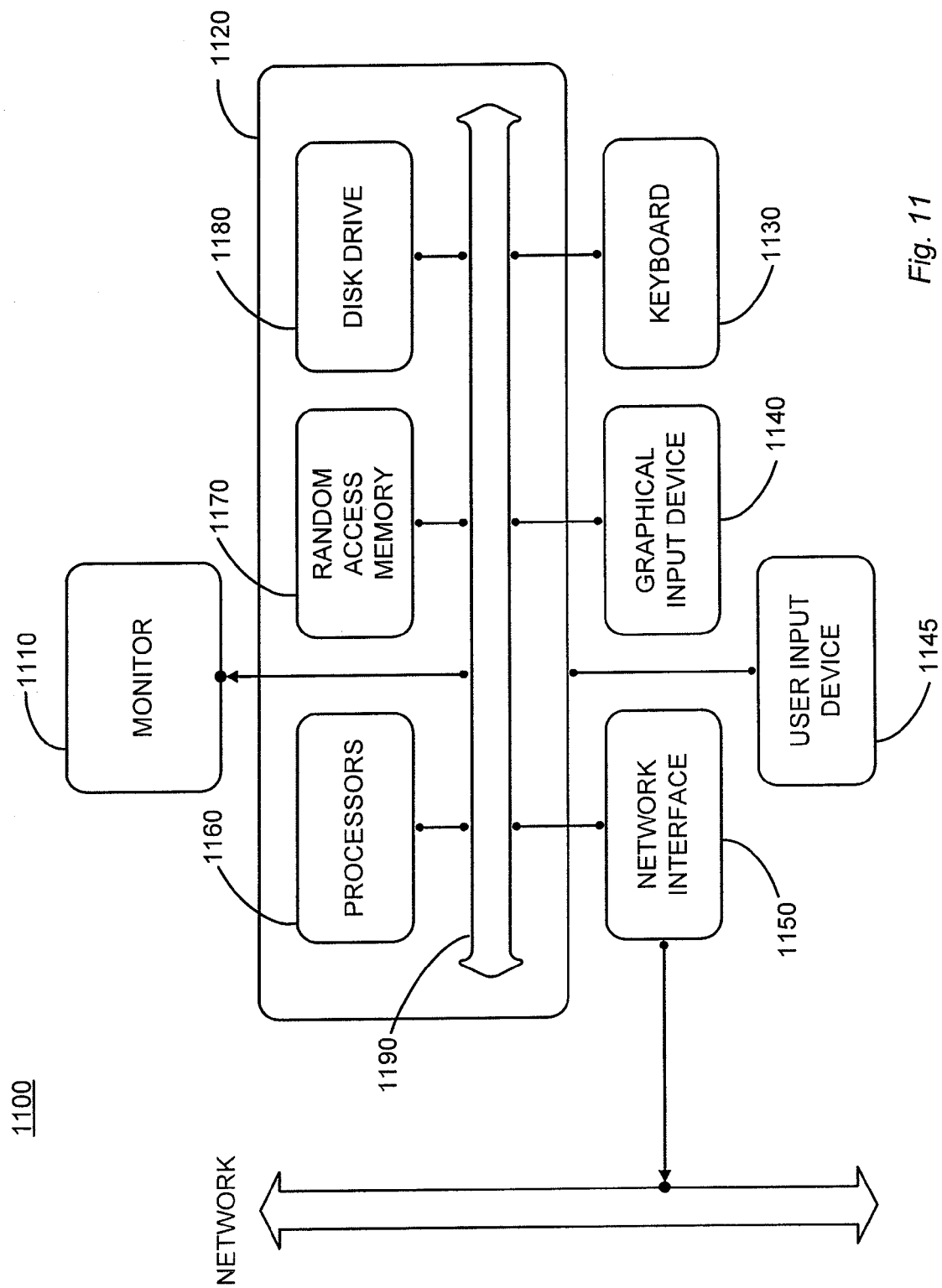
FIG. 11 is a computer system that be used to implement various embodiments of the present invention.

FIG. 11 is a block diagram of typical computer system 1100 configured to execute computer readable code to implement various functions and actions according to various embodiments of the present invention.

System 1100 is representative of a computer system capable of embodying the present invention. The computer system can be present in or used to implement any of the method or computer or server computer embodiments in FIGS. 1 to 10. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 1100 typically includes a display 1110, computer 1120, a keyboard 1130, a user input device 1140, communication or network interface 1150, and the like. In various embodiments, display (monitor) 1110 may be embodied as a CRT display, an LCD display, a plasma display, a direct-projection or rear-projection DLP, a microdisplay, or the like. In various embodiments, display 1110 may be used to display user interfaces and rendered images.

In various embodiments, user input device 1140 is typically embodied as a computer mouse, a trackball, a track pad, a joystick, wireless remote, drawing tablet, voice command system, and the like. User input device 1140 typically allows a user to select objects, icons, text and the like that appear on the display 1111 via a command such as a click of a button or the like. An additional specialized user input device 1145, such a magnetic stripe, RFID transceiver or smart card reader may also be provided in various embodiments. In other embodiments, user input device 1145 include additional computer system displays (e.g. multiple monitors). Further user input device 1145 may be implemented as one or more graphical user interfaces on such a display.

Embodiments of computer interfaces 1150 typically include an Ethernet card, a modem (telephone, satellite, cable, ISDN), (asynchronous) digital subscriber line (DSL) unit, FireWire interface, USB interface, and the like. For example, computer interfaces 1150 may be coupled to a computer network, to a FireWire bus, or the like. In other embodiments, computer interfaces 1150 may be physically integrated on the motherboard of computer 1120, may be a software program, such as soft DSL, or the like.

RAM 1170 and disk drive 1180 are examples of computer-readable tangible media configured to store data such user, account and transaction level data, calculated aggregated data, super keys, sub keys and other executable computer code, human readable code, or the like. Other types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 1100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer 1120 typically includes familiar computer components such as a processor 1160, and memory storage devices, such as a random access memory (RAM) 1170, disk drives 1180, and system bus 1190 interconnecting the above components.

In some embodiments, computer 1100 includes one or more Xeon microprocessors from Intel. Further, in the present embodiment, computer 1120 typically includes a UNIX-based operating system.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for validating a verification token is from a trusted verification token manufacturer, the method comprising:

receiving, at a server computer having one or more microprocessors, a validation request from the verification token, the verification token including a memory storing a verification token specific key pair received from a verification token manufacturer of the verification token;

determining a verification token serial number based on the validation request using the server computer;

determining a registration status of the verification token serial number;

determining a component of the verification token specific key pair associated with the verification token serial number;

signing a challenge message with the component of the verification token specific key pair;

sending the signed challenge message to the verification token;

receiving, from the verification token, a response to the signed challenge message; and validating the verification token manufacturer of the verification token is the trusted verification token manufacturer based on the response to the signed challenge message.

2. The method of claim 1, wherein the challenge message is signed with a private component of the verification token specific key pair.

3. The method of claim 2 further comprising:

determining a verification token manufacturer identifier based on the validation request and determining a first component of a manufacturer specific key pair based on the verification token manufacturer identifier using the server computer; and signing the challenge message with the first component of a manufacturer specific key pair.

4. The method of claim 3 further comprising:

retrieving a second component of the manufacturer specific key and a verification token manufacturer master key from a database based on the verification token manufacturer identifier using the server computer; and performing a mutual authentication with the verification token using the server computer.

5. The method of claim 4 wherein performing the mutual authentication comprises:

determining a verification token key based on the verification token serial number and the verification token manufacturer master key; and establishing a verification token key session based on the verification token key.

6. The method of claim 5 wherein establishing a verification token key session further comprises:

generating a third component of the manufacturer specific key based on the verification token serial number and a master key associated with the server computer.

7. The method of claim 1 wherein the serial number is generated by the verification token manufacturer.

8. The method of claim 1 wherein the serial number is selected from a set of serial numbers assigned to the verification token manufacture.

9. The method of claim 1 wherein the server computer is operated by one of an issuer, an acquirer, a merchant, or a payment processing network.

10. The method of claim 1 further comprising activating the verification token to allow the verification token to communicate with a portable consumer device after validating the verification token is from the trusted verification token manufacturer.

11. A method for producing a verification token, the method comprising:

sending a verification token manufacturer registration request to a validation server;

receiving a manufacturer specific master key from the validation server in response to the validation server validating the verification token manufacturer as a trusted verification token manufacturer;

generating a serial number for the verification token;

generating a key pair including a public component and a private component;

signing the public component of the key pair to generate a verification token public certificate with the manufacturer specific master key received from the validation server;

storing the private component of the key pair and the verification token public certificate signed with the manufacturer specific master key to a memory in the verification token;

associating the serial number with the key pair and the private component of the key pair.

12. The method of claim 11 further comprising storing the serial number to the memory in the verification token.

13. The method of claim 11 further comprising storing a manufacturer identifier to the memory of the verification token.

14. The method of claim 13 further comprising storing code executable on a processor to establish a connection with a verification server over a communication session using a communication facility of a computer to which the verification token is connected.

15. The method of claim 11 further comprising sharing at least the private component of the key pair and the associated serial number with the server.

16. The method of claim 11 wherein the verification token manufacturer is validated as a trusted verification token manufacturer based on a risk review of information about the verification token manufacturer.

* * * * *